(12) United States Patent
Banister et al.

(10) Patent No.: US 10,000,605 B2
(45) Date of Patent: Jun. 19, 2018

(54) SMART POLYMER MATERIALS WITH EXCESS REACTIVE MOLECULES

(71) Applicants: MEDIPACS, INC, San Diego, CA (US); THE ARIZONA BOARD OF REGENTS ON BEHALF OF THE UNIVERSITY OF ARIZONA, Tucson, AZ (US)

(72) Inventors: Mark Banister, Tucson, AZ (US); Yordan Geronov, Tucson, AZ (US); Dominic McGrath, Tucson, AZ (US)

(73) Assignees: MEDIPACS, INC., Tucson, AZ (US); THE ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 0 days. days.

(21) Appl. No.: 14/385,403

(22) PCT Filed: Mar. 13, 2013

(86) PCT No.: PCT/US2013/031062
§ 371 (c)(1),
(2) Date: Sep. 15, 2014

(87) PCT Pub. No.: WO2013/138524
PCT Pub. Date: Sep. 19, 2013

(65) Prior Publication Data
US 2015/0094448 A1    Apr. 2, 2015

Related U.S. Application Data

(60) Provisional application No. 61/610,471, filed on Mar. 14, 2012.

(51) Int. Cl.
| | | |
|---|---|---|
| C08G 59/50 | (2006.01) |
| C08G 59/22 | (2006.01) |
| C08G 65/26 | (2006.01) |
| C08L 63/00 | (2006.01) |
| C08G 83/00 | (2006.01) |

(52) U.S. Cl.
CPC ......... *C08G 65/2624* (2013.01); *C08G 59/22* (2013.01); *C08G 59/504* (2013.01); *C08G 83/004* (2013.01); *C08L 63/00* (2013.01); *C08G 2650/50* (2013.01)

(58) Field of Classification Search
None
See application file for complete search history.

(56) References Cited

U.S. PATENT DOCUMENTS

| | | |
|---|---|---|
| 3,922,328 A | 11/1975 | Johnson |
| 4,034,380 A | 7/1977 | Isayama .......................... 347/19 |
| 4,111,202 A | 9/1978 | Theeuwes |
| 4,190,411 A | 2/1980 | Fujimoto |
| 4,203,440 A | 5/1980 | Theeuwes |
| 4,299,220 A | 11/1981 | Dorman ........................ 604/118 |
| 4,327,725 A | 5/1982 | Cortese et al. ............... 424/427 |
| 4,395,719 A | 7/1983 | Majewski et al. ............... 347/68 |
| 4,423,166 A | 12/1983 | Moriarty et al. ............. 523/414 |
| 4,432,699 A | 2/1984 | Beckman et al. .............. 417/63 |
| 4,449,893 A | 5/1984 | Beckman ...................... 417/322 |
| 4,449,983 A | 5/1984 | Cortese et al. ............... 604/892 |
| 4,507,363 A | 3/1985 | Chow et al. .................. 428/418 |
| 4,524,762 A | 6/1985 | Schulman .................. 297/284.1 |
| 4,538,607 A | 9/1985 | Saul ........................ 128/207.16 |
| 4,551,139 A | 11/1985 | Plaas et al. |
| 4,559,038 A | 12/1985 | Berg et al. |
| 4,595,583 A | 6/1986 | Eckenhoff et al. |
| 4,624,847 A | 11/1986 | Ayer et al. |
| 4,624,848 A | 11/1986 | Lee |
| 4,650,469 A | 3/1987 | Berg et al. |
| 4,655,767 A | 4/1987 | Woodward et al. |
| 4,663,149 A | 5/1987 | Eckenhoff et al. |
| 4,675,174 A | 6/1987 | Eckenhoff |
| 4,723,958 A | 2/1988 | Pope et al. |
| 4,772,474 A | 9/1988 | Eckenhoff et al. |
| 4,781,714 A | 11/1988 | Eckenhoff et al. |
| 4,808,084 A | 2/1989 | Tsubouchi et al. ........... 417/322 |
| 4,810,535 A | 3/1989 | McCollum et al. .......... 427/410 |
| 4,842,493 A | 6/1989 | Nilsson ........................ 417/322 |
| 4,863,456 A | 9/1989 | Stephens et al. |
| 4,948,592 A | 8/1990 | Ayer et al. |
| 4,963,141 A | 10/1990 | Eckenhoff |
| 4,986,260 A | 1/1991 | Iams ............................. 601/149 |
| 5,000,957 A | 3/1991 | Eckenhoff et al. |
| 5,029,939 A | 7/1991 | Smith ........................ 297/284.1 |
| 5,034,229 A | 7/1991 | Magruder et al. |
| 5,037,420 A | 8/1991 | Magruder et al. |
| 5,059,423 A | 10/1991 | Magruder et al. |
| 5,061,242 A | 10/1991 | Sampson |
| 5,070,560 A | 12/1991 | Wilkinson ........................ 5/455 |
| 5,100,933 A | 3/1992 | Tanaka et al. ................ 523/300 |

(Continued)

FOREIGN PATENT DOCUMENTS

| | | | |
|---|---|---|---|
| CA | 2 477 181 | 4/2004 | |
| CN | 1080829 | 3/2002 | ............. F04B 35/00 |

(Continued)

OTHER PUBLICATIONS

Office Action issued in related U.S. Appl. No. 14/071,371, dated Dec. 18, 2014 (11 pgs).

(Continued)

*Primary Examiner* — Michael J Feely
(74) *Attorney, Agent, or Firm* — Hayes Soloway P.C.

(57) ABSTRACT

A three-dimensional smart polymer matrix is formed by a first epoxy chemical reaction linking a linear polymer chain and a branched polymer chain, wherein the polymer chains are flexible and one or more reactive molecule species remain unreacted, at a predetermined mathematical ratio of reacted to un-reacted molecules and molecule species, and the un-reacted molecular species are available for further chemical reaction, protonation or deprotonation after the first chemical reaction. The resulting smart polymer matrix is hydrophilic and non-soluble to a solvent or electrolyte.

14 Claims, 8 Drawing Sheets

(56) References Cited

U.S. PATENT DOCUMENTS

| | | | |
|---|---|---|---|
| 5,105,983 A | 4/1992 | Sancoff et al. | 222/103 |
| 5,110,596 A | 5/1992 | Magruder et al. | |
| 5,175,246 A | 12/1992 | Smith | 523/111 |
| 3,029,743 A | 3/1993 | Johns | 103/150 |
| 5,192,197 A | 3/1993 | Culp | 417/322 |
| 5,192,298 A | 3/1993 | Smith et al. | F04B 35/04 |
| 5,192,304 A | 3/1993 | Rassman | 5/933 |
| 5,232,702 A | 8/1993 | Pfister et al. | |
| 5,246,705 A | 9/1993 | Venkatraman et al. | |
| 5,267,365 A | 12/1993 | Walter | 5/683 |
| 5,275,853 A | 1/1994 | Silvis | 428/35.4 |
| 5,279,544 A | 1/1994 | Gross et al. | |
| 5,279,565 A | 1/1994 | Klein et al. | |
| 5,284,133 A | 2/1994 | Burns et al. | |
| 5,300,299 A | 4/1994 | Sweet et al. | |
| 5,304,121 A | 4/1994 | Sahatjian | |
| 5,327,041 A | 7/1994 | Culp | 310/328 |
| 5,328,696 A | 7/1994 | Noel | |
| 5,336,057 A | 8/1994 | Fukuda et al. | 417/395 |
| 5,348,746 A | 9/1994 | Dong et al. | |
| 5,354,264 A | 10/1994 | Bae et al. | |
| 5,376,378 A | 12/1994 | Li et al. | |
| 5,380,760 A | 1/1995 | Wendel et al. | |
| 5,412,821 A | 5/1995 | Wilkinson | 5/455 |
| 5,429,585 A | 7/1995 | Liang | 601/15 |
| 5,431,921 A | 7/1995 | Thombre | |
| 5,474,783 A | 12/1995 | Miranda et al. | |
| 5,520,643 A | 5/1996 | Ensminger et al. | 604/93 |
| 5,498,255 A | 8/1996 | Wong | |
| 5,546,932 A | 8/1996 | Galli | |
| 5,564,142 A | 10/1996 | Liu | 5/689 |
| 5,573,668 A | 11/1996 | Grosh et al. | |
| 5,587,237 A | 12/1996 | Korpman et al. | |
| RE35,474 E | 3/1997 | Woodard et al. | |
| 5,618,899 A | 4/1997 | Appelt et al. | |
| 5,622,482 A | 4/1997 | Lee | 417/321 |
| 5,630,709 A | 5/1997 | Bar-Cohen | 417/322 |
| 5,633,009 A | 5/1997 | Kenealy et al. | |
| 5,645,855 A | 7/1997 | Lorenz | |
| 5,656,286 A | 8/1997 | Miranda et al. | |
| 5,674,192 A | 10/1997 | Sahatjian et al. | |
| 5,687,748 A | 11/1997 | Conrad et al. | |
| 5,692,256 A | 12/1997 | Kramer et al. | 5/624 |
| 5,714,160 A | 2/1998 | Magruder et al. | |
| 5,718,700 A | 2/1998 | Edgren et al. | |
| 5,779,668 A | 7/1998 | Grabenkort | |
| 5,798,600 A | 8/1998 | Sager et al. | 310/330 |
| 5,810,001 A | 9/1998 | Genga et al. | 128/202.27 |
| 5,823,178 A | 10/1998 | Lloyd et al. | |
| 5,836,900 A | 11/1998 | Leventhal | 297/284.5 |
| 5,891,463 A | 4/1999 | Bello et al. | |
| 5,916,968 A | 6/1999 | Hariharan et al. | |
| 5,939,477 A | 8/1999 | Pretzer et al. | |
| 5,951,999 A | 9/1999 | Therriault et al. | |
| 5,954,706 A | 9/1999 | Sahatjian | |
| 5,955,549 A | 9/1999 | Chang | 525/418 |
| 5,961,298 A | 10/1999 | Bar-Cohen | 417/322 |
| 5,979,892 A | 11/1999 | Smith | 271/267 |
| 5,997,501 A | 12/1999 | Gross et al. | |
| 6,004,115 A | 12/1999 | Da Costa | F04B 17/00 |
| 6,010,485 A | 1/2000 | Buch-Rasmussen et al. | |
| 6,024,976 A | 2/2000 | Miranda et al. | |
| 6,066,325 A | 5/2000 | Wallace et al. | |
| RE36,754 E | 6/2000 | Noel | |
| 6,074,178 A | 6/2000 | Bishop et al. | 417/322 |
| 6,074,179 A | 6/2000 | Jokela | 417/322 |
| 6,106,245 A | 8/2000 | Cabuz | 417/322 |
| 6,109,852 A | 8/2000 | Shahinpoor et al. | 414/1 |
| 6,143,138 A | 11/2000 | Becker | 204/157.15 |
| 6,152,898 A | 11/2000 | Olsen | |
| 6,157,113 A | 12/2000 | Hunter et al. | 310/300 |
| 6,165,155 A | 12/2000 | Jacobsen et al. | |
| 6,174,546 B1 | 1/2001 | Therriault et al. | |
| 6,180,133 B1 | 1/2001 | Quan et al. | |
| 6,183,434 B1 | 2/2001 | Eppstein | |
| 6,184,608 B1 | 2/2001 | Cabuz | 310/309 |
| 6,193,996 B1 | 2/2001 | Effing et al. | |
| 6,206,850 B1 | 3/2001 | O'Neil | |
| 6,210,712 B1 | 4/2001 | Edgren et al. | |
| 6,213,739 B1 | 4/2001 | Phallen et al. | 417/478 |
| 6,221,383 B1 | 4/2001 | Miranda et al. | |
| 6,223,369 B1 | 5/2001 | Maier et al. | 5/713 |
| 6,249,076 B1 | 6/2001 | Madden et al. | 310/363 |
| 6,277,401 B1 | 8/2001 | Bello et al. | |
| 6,312,715 B1 | 11/2001 | Cantor et al. | |
| 6,316,022 B1 | 11/2001 | Mantelle et al. | |
| 6,319,245 B1 | 11/2001 | Berrigan | |
| 6,336,907 B1 | 1/2002 | Dono et al. | 601/150 |
| 6,337,086 B1 | 1/2002 | Kanios et al. | |
| 6,352,715 B1 | 3/2002 | Hwang et al. | |
| 6,365,178 B1 | 4/2002 | Venkateshwaran et al. | |
| 6,365,185 B1 | 4/2002 | Ritschel et al. | |
| 6,368,318 B1 | 4/2002 | Visuri et al. | |
| 6,378,292 B1 | 4/2002 | Youngner | 60/224 |
| 6,387,077 B1 | 5/2002 | Klibanov et al. | |
| 6,392,777 B1 | 5/2002 | Elliott et al. | 359/244 |
| 6,409,716 B1 | 6/2002 | Sahatjian et al. | |
| 6,450,773 B1 | 9/2002 | Upton | 417/53 |
| 6,461,644 B1 | 10/2002 | Jackson et al. | |
| 6,464,476 B2 | 10/2002 | Ross et al. | 417/478 |
| 6,471,686 B1 | 10/2002 | Berrigan | |
| 6,475,639 B2 | 11/2002 | Shahinpoor et al. | 428/614 |
| 6,490,483 B2 | 12/2002 | Willis | 604/20 |
| 6,531,152 B1 | 3/2003 | Lerner et al. | |
| 6,537,194 B1 | 3/2003 | Winkler | |
| 6,578,245 B1 | 6/2003 | Chatterjee et al. | 29/25.35 |
| 6,586,512 B1 | 7/2003 | Dukes | 524/377 |
| 6,632,522 B1 | 10/2003 | Hyde et al. | |
| 6,664,718 B2 | 12/2003 | Pelrine et al. | |
| 6,682,318 B2 | 1/2004 | Takeuchi | 417/322 |
| 6,682,500 B2 | 1/2004 | Soltanpour et al. | 604/9 |
| 6,685,442 B2 | 2/2004 | Chinn et al. | 417/321 |
| 6,726,678 B1 | 4/2004 | Nelson | 604/891.1 |
| 6,766,817 B2 | 7/2004 | Da Silva | F04F 10/00 |
| 6,791,003 B1 | 9/2004 | Choi et al. | |
| 6,796,970 B1 | 9/2004 | Klitmose et al. | |
| 6,809,462 B2 | 10/2004 | Pelrine et al. | 310/319 |
| 6,829,797 B2 | 12/2004 | Partian | 5/710 |
| 6,864,295 B2 | 3/2005 | Mitarai | 521/50.5 |
| 6,869,275 B2 | 3/2005 | Dante et al. | 417/413.2 |
| 6,876,135 B2 | 4/2005 | Pelrine et al. | 310/339 |
| 6,902,704 B2 | 6/2005 | Wilson | 422/100 |
| 6,940,211 B2 | 9/2005 | Pelrine et al. | 310/330 |
| 6,948,636 B1 | 9/2005 | Fischer et al. | 222/103 |
| 6,949,079 B1 | 9/2005 | Westberg et al. | 604/6.11 |
| 6,955,923 B2 | 10/2005 | Hutting | 436/180 |
| 6,960,864 B2 | 11/2005 | Urano et al. | 310/307 |
| 7,285,255 B2 | 10/2007 | Kadlec et al. | A61L 2/16 |
| 7,411,792 B2 | 8/2008 | Richards et al. | 361/704 |
| 7,453,187 B2 | 11/2008 | Richards et al. | 310/339 |
| 7,458,956 B1 | 12/2008 | Adams | 604/158 |
| 7,544,260 B2 | 6/2009 | Banister et al. | 149/2 |
| 7,553,903 B2 | 6/2009 | Riegel et al. | 524/599 |
| 7,572,239 B1 | 8/2009 | Brotz | 601/148 |
| 7,700,129 B2 | 4/2010 | Ito et al. | 424/486 |
| 7,771,176 B2 | 8/2010 | Weber | 417/410.2 |
| 7,820,427 B2 | 10/2010 | Unger et al. | 435/286.5 |
| 8,190,270 B2 | 5/2012 | Wingeier et al. | 607/116 |
| 8,695,640 B2 | 4/2014 | Unger et al. | 137/833 |
| 2001/0053383 A1 | 12/2001 | Miranda et al. | |
| 2002/0001571 A1 | 1/2002 | Wu | 424/61 |
| 2002/0004064 A1 | 1/2002 | Quan et al. | |
| 2002/0007014 A1 | 1/2002 | Hyde et al. | |
| 2002/0010412 A1 | 1/2002 | Eppstein | |
| 2002/0015733 A1 | 2/2002 | Flashner-Barak et al. | |
| 2002/0027384 A1 | 3/2002 | Zur | 297/452.41 |
| 2002/0043895 A1 | 4/2002 | Richards et al. | 310/328 |
| 2002/0073489 A1 | 6/2002 | Totton et al. | 5/713 |
| 2002/0106402 A1 | 8/2002 | Hartwig | |
| 2002/0115740 A1 | 8/2002 | Beuhler et al. | 522/152 |
| 2002/0128572 A1 | 9/2002 | Chang | 601/148 |
| 2002/0128618 A1 | 9/2002 | Frenz et al. | 604/368 |
| 2002/0147208 A1 | 10/2002 | Fleshner-Barak et al. | |
| 2002/0156463 A1 | 10/2002 | Berrigan | |

(56) References Cited

U.S. PATENT DOCUMENTS

| | | | |
|---|---|---|---|
| 2002/0173745 A1 | 11/2002 | Santini et al. | 604/67 |
| 2002/0183738 A1 | 12/2002 | Chee et al. | |
| 2002/0193754 A1 | 12/2002 | Cho | |
| 2003/0014036 A1 | 1/2003 | Varner et al. | |
| 2003/0051292 A1 | 3/2003 | Ferrand et al. | 5/600 |
| 2003/0054025 A1 | 3/2003 | Cantor et al. | |
| 2003/0065303 A1 | 4/2003 | Wellman et al. | |
| 2003/0069359 A1 | 4/2003 | Torii et al. | 525/178 |
| 2003/0072792 A1 | 4/2003 | Flanigan et al. | |
| 2003/0108590 A1 | 6/2003 | Peery et al. | |
| 2003/0124189 A1 | 7/2003 | Zentner et al. | |
| 2003/0135158 A1 | 7/2003 | Gonnelli | |
| 2003/0139495 A1 | 7/2003 | Zentner et al. | |
| 2003/0143257 A1 | 7/2003 | Fleshner-Barak et al. | |
| 2003/0152616 A1 | 8/2003 | Hartwig | |
| 2003/0153900 A1 | 8/2003 | Aceti et al. | |
| 2003/0156953 A1 | 8/2003 | Chinn et al. | 417/332 |
| 2003/0163099 A1 | 8/2003 | Wermeling et al. | |
| 2003/0216683 A1 | 11/2003 | Shekalim | |
| 2003/0232198 A1 | 12/2003 | Lamberti et al. | |
| 2004/0030262 A1 | 2/2004 | Fisher et al. | |
| 2004/0068224 A1 | 4/2004 | Couvillon et al. | 604/67 |
| 2004/0092865 A1 | 5/2004 | Flaherty et al. | |
| 2004/0102762 A1 | 5/2004 | Gilbert | |
| 2004/0106893 A1 | 6/2004 | Hunter | |
| 2004/0106894 A1 | 6/2004 | Hunter et al. | |
| 2004/0112442 A1 | 6/2004 | Maerkl et al. | 137/597 |
| 2004/0133159 A1 | 7/2004 | Haider et al. | |
| 2004/0138603 A1 | 7/2004 | Cleary et al. | |
| 2004/0142023 A1 | 7/2004 | Hartwig | |
| 2004/0149288 A1 | 8/2004 | Koch | |
| 2004/0176502 A1 | 9/2004 | Raymond et al. | 523/416 |
| 2004/0176748 A1 | 9/2004 | Abramson et al. | |
| 2004/0186419 A1 | 9/2004 | Cho | |
| 2004/0202708 A1 | 10/2004 | Roehrig et al. | |
| 2004/0204677 A1 | 10/2004 | Wellman et al. | |
| 2004/0219194 A1 | 11/2004 | Finckh et al. | |
| 2004/0220548 A1 | 11/2004 | Heruth et al. | |
| 2004/0234401 A1 | 11/2004 | Banister | 417/474 |
| 2004/0242709 A1 | 12/2004 | Oguro et al. | 521/27 |
| 2004/0265545 A1 | 12/2004 | McKean et al. | 428/189 |
| 2005/0009976 A1 | 1/2005 | Akkapeddi et al. | 524/445 |
| 2005/0033230 A1 | 2/2005 | Alchas et al. | |
| 2005/0043657 A1 | 2/2005 | Couvillon | 601/134 |
| 2005/0058695 A1 | 3/2005 | Anigbogu et al. | |
| 2005/0137577 A1 | 6/2005 | Heruth et al. | |
| 2005/0137578 A1 | 6/2005 | Heruth et al. | |
| 2005/0137579 A1 | 6/2005 | Heruth et al. | |
| 2005/0261631 A1 | 11/2005 | Clarke et al. | |
| 2005/0273081 A1 | 12/2005 | Olsen | |
| 2005/0273082 A1 | 12/2005 | Olsen | |
| 2005/0287214 A1 | 12/2005 | Ayer et al. | |
| 2006/0021614 A1 | 2/2006 | Wermeling et al. | |
| 2006/0076540 A1 | 4/2006 | Zama et al. | 252/500 |
| 2006/0078603 A1 | 4/2006 | Nguyen | |
| 2006/0078604 A1 | 4/2006 | Kanios et al. | |
| 2006/0084942 A1 | 4/2006 | Kim et al. | |
| 2006/0089619 A1 | 4/2006 | Ginggen | 604/891.1 |
| 2006/0094985 A1 | 5/2006 | Aceti et al. | |
| 2006/0094989 A1 | 5/2006 | Scott et al. | 601/5 |
| 2006/0110596 A1 | 5/2006 | Palasz et al. | |
| 2006/0135911 A1 | 6/2006 | Mittur | |
| 2006/0142478 A1 | 6/2006 | Luo | 525/54.1 |
| 2006/0142875 A1 | 6/2006 | Keyes et al. | 700/1 |
| 2006/0146475 A1 | 7/2006 | Zhong et al. | 361/301.1 |
| 2006/0183216 A1 | 8/2006 | Handique et al. | 435/287.1 |
| 2006/0188558 A1 | 8/2006 | Jackson et al. | |
| 2006/0195057 A1 | 8/2006 | Kriesel et al. | 604/19 |
| 2006/0200083 A1 | 9/2006 | Freyman et al. | 604/181 |
| 2006/0204532 A1 | 9/2006 | John | |
| 2006/0213674 A1 | 9/2006 | Dierker, Jr. et al. | |
| 2006/0276744 A1 | 12/2006 | Falk | |
| 2007/0021697 A1 | 1/2007 | Ginther et al. | |
| 2007/0031495 A1 | 2/2007 | Eppstein et al. | |
| 2007/0033738 A1 | 2/2007 | Tu | 5/710 |
| 2007/0052139 A1 | 3/2007 | Gilbert | |
| 2007/0070684 A1 | 3/2007 | Poulos | 365/149 |
| 2007/0078376 A1 | 4/2007 | Smith | |
| 2007/0082038 A1 | 4/2007 | Gale et al. | |
| 2007/0088267 A1 | 4/2007 | Shekalim | |
| 2007/0092570 A1 | 4/2007 | Missel et al. | |
| 2007/0098771 A1 | 5/2007 | Audett | |
| 2007/0098772 A1 | 5/2007 | Westcott et al. | |
| 2007/0100355 A1 | 5/2007 | Bonde et al. | |
| 2007/0104771 A1 | 5/2007 | Audett et al. | |
| 2007/0134310 A1 | 6/2007 | Nedberge et al. | |
| 2007/0148218 A1 | 6/2007 | Gordon | |
| 2007/0190150 A1 | 8/2007 | Ito et al. | 424/486 |
| 2007/0224253 A1 | 9/2007 | Franklin | |
| 2007/0260201 A1 | 11/2007 | Prausnitz et al. | |
| 2007/0269522 A1 | 11/2007 | Wold | |
| 2007/0293826 A1 | 12/2007 | Wall et al. | |
| 2008/0004421 A1* | 1/2008 | Chenault | C08G 73/024 528/310 |
| 2008/0009800 A1 | 1/2008 | Nickel | |
| 2008/0015494 A1 | 1/2008 | Santini, Jr. et al. | |
| 2008/0033228 A1 | 2/2008 | Rastegar et al. | 600/16 |
| 2008/0039791 A1 | 2/2008 | Abboud et al. | 604/113 |
| 2008/0058706 A1 | 3/2008 | Zhang et al. | |
| 2008/0063698 A1 | 3/2008 | Hartwig | |
| 2008/0091139 A1 | 4/2008 | Srinivasan et al. | 604/68 |
| 2008/0110463 A1 | 5/2008 | Hajgato et al. | |
| 2008/0125744 A1 | 5/2008 | Treacy | |
| 2008/0152592 A1 | 6/2008 | Rebec | |
| 2008/0167641 A1 | 7/2008 | Hansen et al. | |
| 2008/0183144 A1 | 7/2008 | Trautman et al. | |
| 2008/0195018 A1 | 8/2008 | Larson et al. | 602/53 |
| 2008/0208107 A1 | 8/2008 | McRae et al. | |
| 2008/0214987 A1 | 9/2008 | Xu | |
| 2008/0221552 A1 | 9/2008 | Leonard | |
| 2008/0234656 A1 | 9/2008 | Pettis et al. | |
| 2008/0312610 A1 | 12/2008 | Binks et al. | |
| 2008/0317615 A1 | 12/2008 | Banister | 417/413.1 |
| 2009/0007904 A1 | 1/2009 | Schuster et al. | |
| 2009/0020521 A1 | 1/2009 | Blaszczykiewicz et al. | 219/529 |
| 2009/0026069 A1 | 1/2009 | Liao et al. | 204/274 |
| 2009/0041833 A1 | 2/2009 | Bettinger et al. | |
| 2009/0042970 A1 | 2/2009 | Herschkowitz et al. | |
| 2009/0048555 A1 | 2/2009 | Stryker et al. | |
| 2009/0060986 A1 | 3/2009 | Yum et al. | |
| 2009/0085444 A1 | 4/2009 | Alvarez Icaza Rivera et al. | 310/365 |
| 2009/0093912 A1 | 4/2009 | Wilker | 700/282 |
| 2009/0099545 A1 | 4/2009 | Nilsson et al. | |
| 2009/0118662 A1 | 5/2009 | Schnall | |
| 2009/0144909 A1 | 6/2009 | Skinner | 5/713 |
| 2009/0193590 A1 | 8/2009 | Hata | 5/713 |
| 2009/0221971 A1 | 9/2009 | Mejlhede et al. | |
| 2009/0227988 A1 | 9/2009 | Wood, Jr. et al. | 604/891.1 |
| 2009/0232685 A1 | 9/2009 | Kamitani et al. | 417/413.2 |
| 2009/0317442 A1 | 12/2009 | Banister et al. | 424/423 |
| 2010/0004638 A1 | 1/2010 | Gibson | 604/891.1 |
| 2010/0074953 A1 | 3/2010 | Chaouk et al. | 424/484 |
| 2010/0180384 A1 | 7/2010 | Balonick et al. | 5/709 |
| 2011/0172645 A1 | 7/2011 | Moga et al. | |
| 2012/0029430 A1 | 2/2012 | Banister et al. | 604/151 |
| 2013/0172180 A1 | 7/2013 | Naumann | 502/402 |
| 2013/0337566 A1 | 12/2013 | Schmidt | 435/404 |
| 2014/0048558 A1 | 2/2014 | Lee | 222/95 |

FOREIGN PATENT DOCUMENTS

| | | | |
|---|---|---|---|
| CN | 1369039 | 9/2002 | B01L 3/00 |
| CN | 1845967 | 10/2006 | C08L 77/00 |
| CN | 1934776 A | 3/2007 | H02N 11/00 |
| DE | 199 12 606 | 12/2000 | F04B 43/04 |
| EP | 0 723 982 | 7/1996 | C08G 59/56 |
| EP | 0 736 556 | 9/1996 | C08G 59/00 |
| EP | 0882890 | 12/1998 | F04B 45/053 |
| EP | 1 454 935 | 8/2004 | C08G 59/00 |
| JP | 58/25326 | 2/1983 | |
| JP | 60-235847 | 11/1985 | |
| JP | 02-004826 | 1/1990 | |
| JP | 02 137 930 | 5/1990 | B41J 2/05 |

(56) References Cited

FOREIGN PATENT DOCUMENTS

| | | | |
|---|---|---|---|
| JP | 08-283540 | 10/1996 | |
| JP | 09 287 571 | 11/1997 | ............. F04B 43/04 |
| JP | 2004-514770 | 5/2004 | |
| JP | 2004-261045 | 9/2004 | |
| JP | 2004-269882 | 9/2004 | |
| JP | 2005269773 | 9/2005 | ............. F03G 7/00 |
| JP | 2006353034 | 12/2006 | ............. H02N 2/00 |
| JP | 2008211915 | 9/2008 | ............. F03G 7/00 |
| JP | 2009046649 | 3/2009 | ............. C08F 12/34 |
| JP | 2009543902 | 12/2009 | ............. C08G 59/50 |
| WO | WO 96/17170 | 6/1996 | ............. F04B 35/00 |
| WO | WO 96/20971 | 11/1996 | ............. C08G 63/00 |
| WO | WO 97/42412 | 11/1997 | ............. F04B 43/12 |
| WO | WO 00/28215 | 5/2000 | ............ F04B 45/047 |
| WO | WO 02/44240 | 6/2002 | ............. C08G 59/40 |
| WO | WO 2004/031581 | 4/2004 | |
| WO | WO2004031580 | 4/2004 | ............. F04B 43/04 |
| WO | WO 2004/076859 | 9/2004 | ............. F04B 43/04 |
| WO | WO 2005/061014 | 7/2005 | |
| WO | WO 2005/118008 | 12/2005 | |
| WO | WO 2006/065884 | 6/2006 | |
| WO | WO 2008/079440 | 7/2008 | ............. C08L 63/10 |
| WO | WO2008129549 | 10/2008 | ............ A61M 5/148 |
| WO | WO 2009/069086 | 4/2009 | |
| WO | WO2011032011 | 3/2011 | ............ A61M 5/142 |
| WO | WO2011094747 | 8/2011 | ................ C08J 5/20 |

OTHER PUBLICATIONS

Japanese Office Action (with translation) issued in related application No. 2012-551386, dated Jan. 28, 2015 (9 pgs).
Office Action issued in related U.S. Appl. No. 13/395,627, dated Feb. 5, 2015 (7 pgs).
Chinese Board Decision, Appln. No. 200580048306.3, dated Dec. 26, 2014 (14 pgs).
Office Action issued in related U.S. Appl. No. 12/373,245, dated Feb. 9, 2015 (11 pgs).
Office Action issued in related U.S. Appl. No. 12/918,466, dated Jul. 11, 2013 (36 pgs).
India Hearing Notice in Reference of Application No. 3011/CHENP/2007, dated Feb. 5, 2015 (1 pg).
Office Action issued in U.S. Appl. No. 13/018,024, dated Feb. 24, 2015 (31 pgs).
Office Action issued in U.S. Appl. No. 13/424,172, dated Jun. 10, 2015 (25 pgs).
Office Action issued in U.S. Appl. No. 14/347,597, dated Jun. 3, 2015 (33 pgs).
Indian Office Action issued in application No. 137/CHENP/2009, dated Mar. 17, 2015 (2 pgs).
Office Action issued in U.S. Appl. No. 12/745,880, dated Jul. 22, 2015 (23 pgs).
Chinese Office Action issued in application No. 201180007957.3, dated May 22, 2015 (11 pgs).
Office Action issued in U.S. Appl. No. 13/018,024, dated Aug. 4, 2015 (10 pgs).
Notice of Allowance issued in U.S. Appl. No. 13/395,627, dated Sep. 16, 2015 (22 pgs).
Office Action issued in U.S. Appl. No. 12/373,245, dated Sep. 9, 2015 (20 pgs).
Chinese Office Action issued in application No. 201280057499.9, dated Aug. 28, 2015 (13 pgs).
Indian Office Action issued in application No. 137/CHENP/2009, dated Oct. 29, 2015 (2 pgs).
Office Action issued in U.S. Appl. No. 12/918,466, dated Nov. 19, 2015 (25 pgs).
Extended European Search Report issued in application No. 12836396.7, dated Nov. 10, 2015 (12 pgs).
Chinese Office Action (w/translation) issued in application No. 201380022758.9, dated Dec. 14, 2015 (12 pgs).

Banister et al., "Molecular Engineering of Polymer Actuators for Biomedical and Industrial Use," Electroactive Polymer Actuators and Devices (EAPAD) 2012, vol. 8340 (20 pgs).
"An Electrochemical Microactuator: Principle and First Results", Neagu et al. Journal of Microelectromechanical Systems, vol. 5, No. 1, Mar. 1996 (7 pgs).
"ElectroActive Polymers—EAPs," downloaded from http://www.azom.com on Dec. 16, 2013 (5 pgs).
"Epoxy-Based Electroactive Polymer Gels", Yoshioka Y and Calvert P, Experimental Mechanics, vol. 42, No. 4, Dec. 2002, pp. 404-408 (5 pgs).
"Magnetic Driven Compression Cascade and Packaging", IBM Technical Disclosure Bulletin, IBM Corp., col. 38, co. 1, Jan. 1995 (3 pgs).
"Micro-Dispensing Positive Displacement Pump", Anonymous, Research Disclosure, Mason Publications, Hampshire GB, vol. 374, No. 4, Jun. 1995 (9 pgs).
"Structure and Mechanism of Two Types of Micro-Pump Using Polymer Gel", Hattori et al., Micro Electro Mechanical Systems, 1992, MEMS 92, Proceedings. An Investigation of Micro Structures, Sensors, Actuators, Machines and Robot, IEEE Travemunde, Germany, Feb. 1992 (6 pgs).
Bar-Cohen, Y., "Electroactive polymers (EAP) actuators as artificial muscles: reality, potential and challenges," SPIE Press, 2001, 671 pgs, (book description only, 4 pgs).
Canadian Official Action issued in Appln. No. 2,557,325, dated Feb. 8, 2011 (5 pgs).
Chinese Notification of ReExamination and English translation, Appln. or Pat. No. 200580048306.3; dated Aug. 22, 2014 (11 pgs).
Chinese Office Action (w/English translation) issued in corresponding application No. 200780032137.3, dated Mar. 12, 2013 (14 pgs).
Chinese Office Action and Translation dated Jul. 6, 2011 issued in Chinese Patent Appln. No. 200780032137.3 (7 pgs).
Chinese Office Action dated Jul. 1, 2014 with English translation, Appln. No. or Patent No. 201180007957.3 (17 pgs).
Chinese Office Action, Application/Patent No. 200780032137.3, dated Dec. 23, 2011 (6 pgs).
Chinese Official Action + translation dated Feb. 1, 2011 issued in Appln. No. 200780032137.3, (8 pgs).
Chinese Official Action dated Mar. 17, 2011, Appin. No. 200580048306.3 (5 pgs).
Chinese Official Action issued in corresponding Chinese Patent Appln. Serial No. 200580048306.3 dated Nov. 4, 2011 (5 pgs).
European Office Action dated Sep. 14, 2010, Appln. No. 07 872 242.8-2102, (6 pgs).
European Official Action issued in Appln. No. 04714231.0, dated May 11, 2011 (2 pgs).
European Official Action issued in Appln. No. 04714231.0-2315/1611353, dated Oct. 4, 2010 (4 pgs).
European Official Action, dated Apr. 6, 2011 issued in Appln. No. 07 872 242.8-2102 (4 pages).
European Official Action, dated Aug. 29, 2011 issued in Appln. No. 07 872 242.8-2102 (6 pages).
European Search Report dated Feb. 18, 2011 issued in corresponding Appln. No. 10014840.2-2315 (7 pgs).
European Search Report dated Jun. 8, 2009, Serial No. 07872242.8-2102 (7 pgs).
First Examination Report dated Dec. 31, 2013, Indian Patent Application No. 3011/CHENP/2007 (2 pgs).
Indian Examination Report; Indian Patent Application Serial No. 2371/CHENP/2005, dated Sep. 7, 2006 (2 pgs).
International Preliminary Report on Patentability issued in PCT/US10/48489 dated Mar. 13, 2012 (12 pgs).
International Search Report and Written Opinion issued in corresponding PCT Patent Appln. Serial No. PCT/US2012/057129 dated Apr. 1, 2014 ( 7 pgs).
International Search Report and Written Opinion of the International Search Authority issued in PCT/US09/34557, dated Apr. 13, 2009 (6 pgs).
Japanese Office Action with translation, Patent Appln. 2009-519642, dated Jul. 9, 2012 (9 pgs).
Office Action issued in related U.S. Appl. No. 10/786,718, dated Mar. 5, 2008 (41 pgs).

(56) References Cited

OTHER PUBLICATIONS

Office Action issued in related U.S. Appl. No. 10/786,718, dated Sep. 16, 2008 (8 pgs).
Office Action issued in related U.S. Appl. No. 10/786,718, dated Jan. 2, 2009 (9 pgs).
Office Action issued in related U.S. Appl. No. 10/786,718, dated Jul. 1, 2009 (7 pgs).
Office Action issued in related U.S. Appl. No. 10/786,718, dated Dec. 28, 2009 (6 pgs).
Office Action issued in related U.S. Appl. No. 10/786,718, dated May 5, 2010 (7 pgs).
Office Action issued in related U.S. Appl. No. 10/786,718, dated Sep. 15, 2010 (8 pgs).
Office Action issued in related U.S. Appl. No. 10/786,718, dated Nov. 23, 2010 (10 pgs).
Office Action issued in related U.S. Appl. No. 11/254,537, dated Sep. 17, 2007 (8 pgs).
Office Action issued in related U.S. Appl. No. 11/254,537, dated Mar. 4, 2008 (8 pgs).
Office Action issued in related U.S. Appl. No. 11/254,537, dated Jul. 21, 2008 (10 pgs).
Office Action issued in related U.S. Appl. No. 11/254,537, dated Dec. 15, 2008 (8 pgs).
Office Action issued in related U.S. Appl. No. 12/373,245, dated Feb. 2, 2011 (13 pgs).
Office Action issued in related U.S. Appl. No. 12/373,245, dated Jul. 22, 2011 (11 pgs).
Office Action issued in related U.S. Appl. No. 12/373,245, dated Jun. 30, 2014 (18 pgs).
Office Action issued in related U.S. Appl. No. 12/414,536, dated Nov. 29, 2010 (8 pgs).
Office Action issued in related U.S. Appl. No. 12/978,152, dated May 23, 2011 (9 pgs).
Office Action issued in related U.S. Appl. No. 13/018,024, dated Aug. 7, 2014 (17 pgs).
Office Action issued in related U.S. Appl. No. 13/093,648, dated Aug. 29, 2013 (5 pgs).
Office Action issued in related U.S. Appl. No. 13/395,627, dated Sep. 10, 2014 (9 pgs).
Office Action issued in related U.S. Appl. No. 13/424,172, dated Jun. 27, 2012 (14 pgs).
Office Action issued in related U.S. Appl. No. 13/424,172, dated Nov. 9, 2012 (6 pgs).
Office Action issued in related U.S. Appl. No. 14/071,371, dated Aug. 21, 2014 (16 pgs).
Office Action issued in related U.S. Appl. No. 12/745,880, dated Jun. 3, 2013 (8 pgs).
Office Action dated Nov. 23, 2012 in U.S. Appl. No. 12/745,880 (26 pgs.).
Official Action received in corresponding Chinese Application No. 200480010203.3, dated Sep. 14, 2007 (19 pgs).
Official Action received in corresponding Chinese Application No. 200480010203.3, dated Nov. 14, 2008 (5 pgs).
Official Action received in corresponding EPO Application. No. 04 714 231.0-2315, dated Nov. 13, 2008 (5 pgs).
Official Action, U.S. Appl. No. 11/721,800, dated Aug. 27, 2010 (13 pgs).
PCT International Preliminary Report on Patentability, dated Aug. 26, 2005, PCT/US04/005922 (11 pgs).
PCT International Search Report and Written Opinion, dated Oct. 22, 2004, PCT/US04/005922 (17 pgs).
PCT International. Search Report and International Preliminary Report on Patentability, dated Oct. 25, 2006, PCT/US05/45210 (10 pgs).
PCT International Search Report and International Preliminary Report on Patentability, dated Jul. 7, 2008, PCT/US07/73188 (8 pgs).
PCT International Search Report and International Preliminary Report on Patentability, dated Feb. 19, 2009, PCT/US08/85421 (7 pgs).

PCT International Search Report and Written Opinion dated Mar. 28, 2011 PCT/US11/23375 (10 pgs).
PCT International Preliminary Report on Patentability issued in PCT/US2013/031062, dated Sep. 16, 2014 (9 pgs).
Search Report and Written Opinion received in Applicant's corresponding European Patent Application Serial No. 05854009.7, dated Nov. 11, 2009 (8 pgs).
Supplemental European Search Report issued in EP04714231, dated Jan. 25, 2007 (2 pgs).
Unsolicited letter from Dr. Elson Silva, dated Oct. 21, 2010 (5 pgs).
Yoshioka et al., "Electrically Driven Miniature Hydrogels as Muscle-Like Acuators", 2001; Proceedings of SPIE vol. 4329, pp. 216-222 (7 pgs).
Office Action issued in U.S. Appl. No. 12/373,245, dated Jun. 1, 2016 (17 pgs).
Chinese Office Action issued in application No. 201280057499.9, dated Jun. 28, 2016 (13 pgs).
Chinese Office Action issued in application No. 201180007957.3, dated Feb. 15, 2016 (12 pgs).
European Office Action issued in application No. 13 760 829.5, dated Jan. 26, 2016 (4 pgs).
Notice of Allowance issued in U.S. Appl. No. 13/018,024, dated Mar. 2, 2016 (24 pgs).
Office Action issued in U.S. Appl. No. 12/745,880, dated Feb. 26, 2016 (13 pgs).
Office Action issued in U.S. Appl. No. 13/424,172, dated Feb. 24, 2016 (22 pgs).
Office Action issued in U.S. Appl. No. 14/347,597, dated Feb. 25, 2016 (32 pgs).
Chinese Office Action (w/translation) issued in application No. 201510131814.3, dated Aug. 22, 2016 (16 pgs).
Chinese Office Action issued in application No. 201180007957.3, dated Oct. 24, 2016 (12 pgs).
European Invitation issued in application No. 11 737 864.6, dated Dec. 19, 2016 (2 pgs).
European Search Report issued in application No. 13760829.5, dated Nov. 28, 2016 (11 pgs).
Indian Hearing Notice issued in application No. 137/CHENP/2009, dated Sep. 11, 2016 (3 pgs).
Japanese Office Action (no translation) issued in application No. 2010-537033, dated Sep. 10, 2013 (1 pg).
Japanese Office Action (no translation) issued in application No. 2010-537033, dated Apr. 10, 2013 (2 pgs).
Japanese Office Action (w/translation) issued in application No. 2015-500577, dated Jan. 4, 2017 (9 pgs).
Office Action issued in U.S. Appl. No. 12/918,466, dated Feb. 23, 2017 (38 pgs).
Office Action issued in U.S. Appl. No. 13/424,172, dated Sep. 20, 2016 (21 pgs).
Office Action issued in U.S. Appl. No. 14/385,403, dated Dec. 7, 2016 (22 pgs).
Chinese Office Action issued in application No. 201380022758.9, dated Aug. 15, 2016 (8 pgs).
Notice of Allowance issued in U.S. Appl. No. 12/745,880, dated Oct. 7, 2016 (23 pgs).
Office Action issued in U.S. Appl. No. 14/347,597 dated Oct. 7, 2016 (22 pgs).
U.S. Appl. No. 14/385,403, filed Sep. 15, 2014.
U.S. Appl. No. 15/357,914, filed Nov. 21, 2016.
U.S. Appl. No. 14/997,254, filed Jan. 15, 2016.
U.S. Appl. No. 10/786,718, filed Feb. 24, 2004.
U.S. Appl. No. 11/254,534, filed Oct. 20, 2005.
U.S. Appl. No. 11/721,800, filed Jun. 14, 2007.
U.S. Appl. No. 12/373,245, filed Jan. 9, 2009.
U.S. Appl. No. 12/414,536, filed Mar. 30, 2009.
U.S. Appl. No. 12/745,880, filed Jun. 2, 2010.
U.S. Appl. No. 12/978,152, filed Dec. 23, 2010.
U.S. Appl. No. 13/018,024, filed Jan. 31, 2011.
U.S. Appl. No. 13/093,648, filed Apr. 25, 2011.
U.S. Appl. No. 13/395,627, filed Mar. 12, 2012.
U.S. Appl. No. 13/424,172, filed Mar. 19, 2012.

(56) References Cited

OTHER PUBLICATIONS

U.S. Appl. No. 14/071,371, filed Nov. 4, 2013.
U.S. Appl. No. 14/347,597, filed Mar. 26, 2014.

* cited by examiner

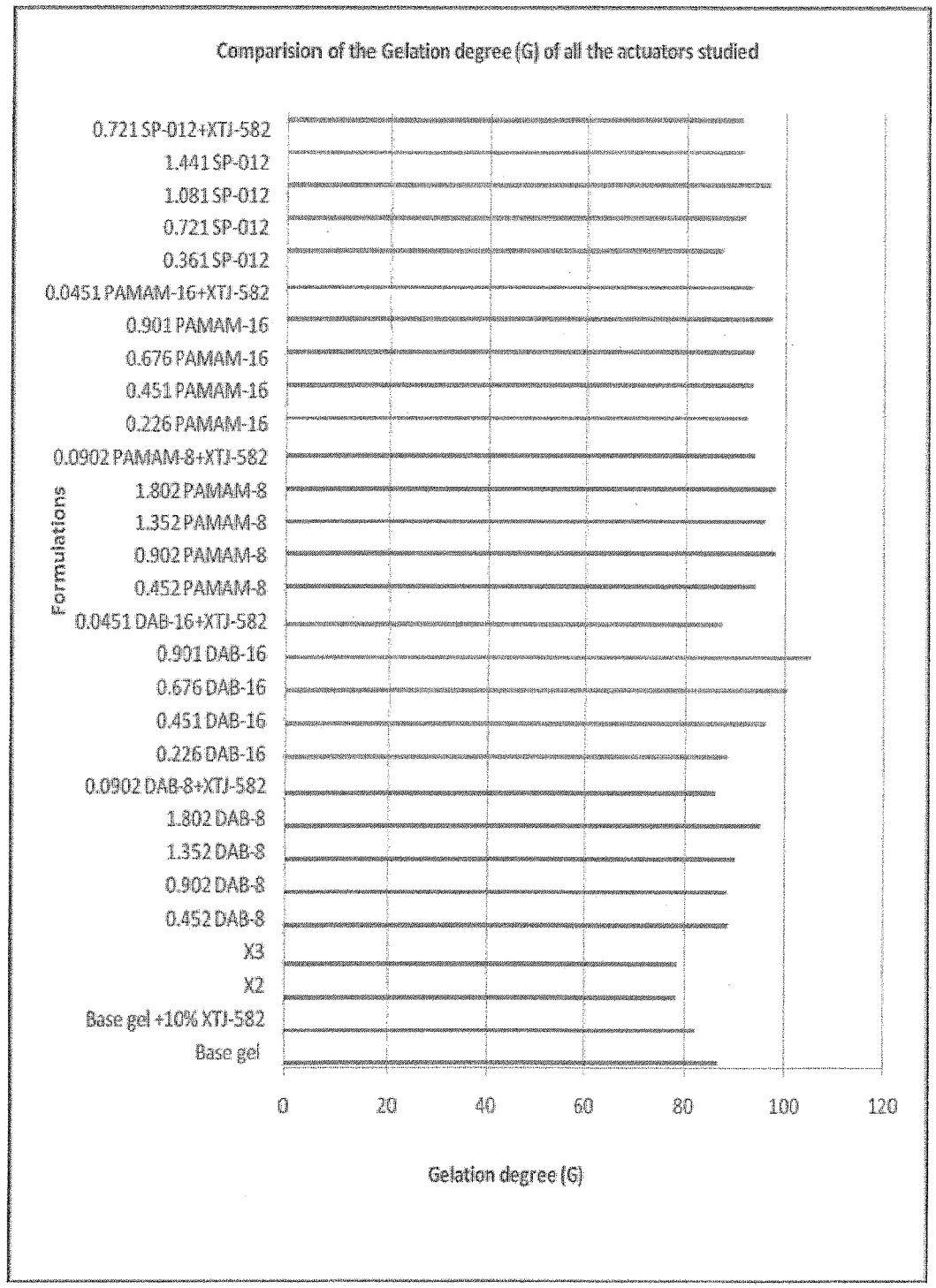
Fig. 15 Gelation degree (G) of hydrogels

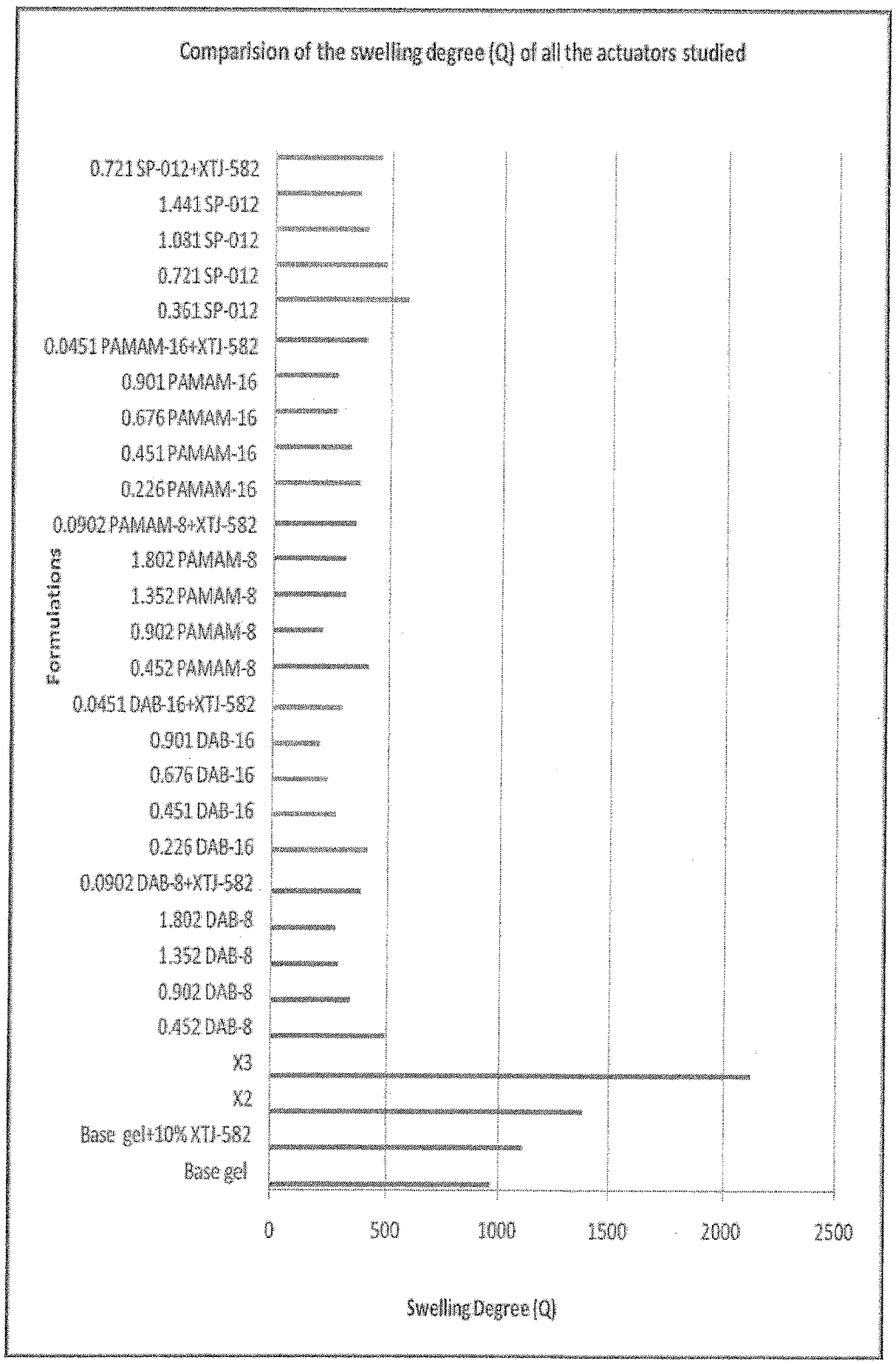
Fig. 16 Swelling degree (Q) of hydrogels

SMART POLYMER MATERIALS WITH EXCESS REACTIVE MOLECULES

This invention was made with Government support under National Science Foundation under TIP STTR Grant No. 0848528. Therefore, the United States Government may have certain rights in this invention.

Smart polymers, electro-active polymer (EAP) gels, hydrogels, and drug eluting polymer gels have all long been the subject of extensive development and investigation for some time. The majority of the literature today refers to each of these as if they were each a specific discipline or classification of materials when, if looked at from a molecular engineering approach, there is a common mechanism of action in many of these materials: a physical change or swelling and de-swelling of a 3-dimensional (3D) polymer matrix on which there are reactive and un-reactive molecular units or sites. Each of these structures are based on cross-linked gels that have been covalently linked at specific molecular sites using a variety of polymer initiation (e.g. radical, thermal, photo, redox, anionic, cationic, coordination) and propagation (e.g. step, chain, ring-opening) methods as well as different polymer types (e.g. addition, condensation).

The affinity of the 3D polymer networks for a particular solvent or electrolyte enables the gel to swell or de-swell. The network typically is defined as hydrophilic or hydrophobic, and this is determined by the nature of the molecular units on the polymer chains. The hydrophobic or hydrophilic nature is dictated by the thermodynamic parameters of solvent and electrolyte interaction with the molecular units. The thermodynamic parameters can be dramatically altered by the introduction of charge to the polymer matrix thereby changing the nature of the interaction with solvent or electrolyte. The kinetics of uptake or expulsion of a solvent or electrolyte is influenced by the porosity, density and surface area of the polymer 3D network and by laws of diffusion. In general the more porous a structure is the faster it can uptake or expel solvent, but with polymer gels for use as actuators the more porosity there is the less structurally sound the polymer is under load. Notwithstanding, we found that this limitation can be countered, by increasing the surface area of the polymer in the actuator design.

According to the present invention, polymer gels, not usually thought of as structurally strong, can be quite useful as mechanical actuation devices, so much so that the epoxy polymer gels explored, can be engineered to meet a variety of specific performance requirements. More particularly, we have determined that the chemical kinetics, the end products, physical properties including speed and force generated by swelling and de-swelling of a 3D polymer matrix, can be molecularly engineered by varying the quantity, type and ratio of reactive molecules in the gel. Furthermore, polymer chain length impacts the actuator both by the size of the swelling response and by the number of molecules available on the chain to produce force. Our findings more importantly show that the molecular reactive units combined provide the actual driving forces and these reactive molecules can be left un-reacted in the polymerization process, where the reactive molecules can then be used to effectively increase the speed and force generated by the actuator. As a result the quantity, type and ratio of molecular reactive units can be tailored to produce forces needed for practical applications of the actuators. The ratio and the density of their electrostatic charges, as well as their affinity for the solvent or electrolyte used, play an important role in the gel's actuation performance through protonation or deprotonation. Protonation is the addition of a proton ($H^+$) to an atom, molecule, or ion. Deprotonation is the removal of a proton ($H^+$) from a molecule, forming the conjugate base.

The relative ability of a molecule to give up a proton is measured by its $pK_a$ value, some molecules can have multiple pKa values with dissociation and differing pH levels. Electrolyte molecules or ions can be used according to the performance required. Electrolytes can be mixed according to pKa values and this will modify the performance and swelling range of the polymer.

We also have found that surprisingly, the excess reactive units do not need to be part of the polymer chain, and can be simply placed or entangled within the polymer matrix in order to have significant impact on the gels performance characteristics. Previously we reported[1], the results of epoxy-amine hydrogel synthesis and the gel characterization. The present disclosure extends our study on the epoxy polymer gels actuator performance under various conditions that are needed for an actuator to be useful in an industrial or consumer product.

Epoxy amine hydrogels were prepared by reacting branched polyethylene amine polymers such as branched Ethyleneimine or Jeffamine T-403, with the di-epoxide Poly (ethylene glycol) diglycidyl ether (PEGDGE) compounds are water soluble and readily polymerize.

Further features and advantages of the present invention will be seen from the following detailed description, taken in conjunction with the accompanying drawings, wherein.

Figure 6:
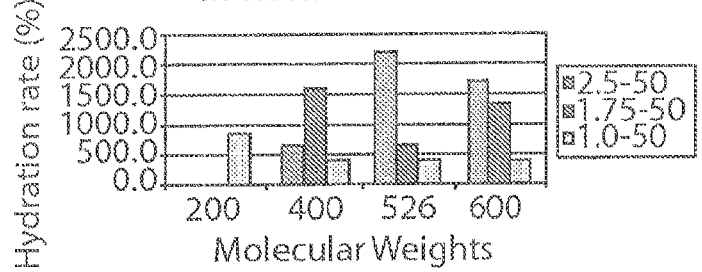
Figure 7:
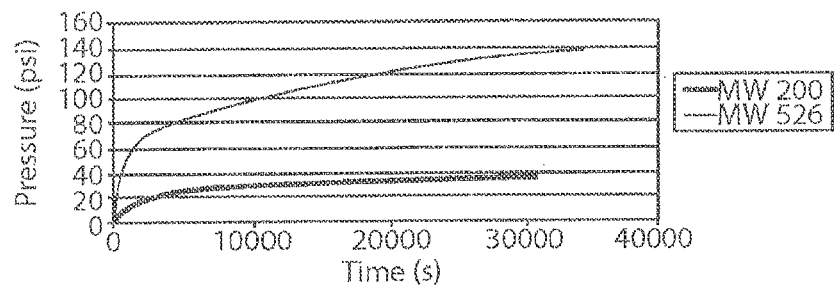
Figure 8:
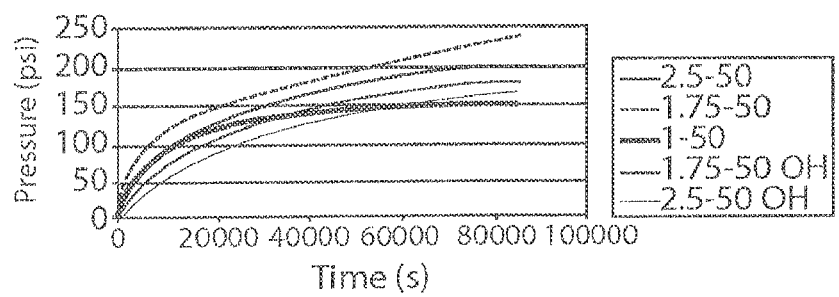
Figure 9:
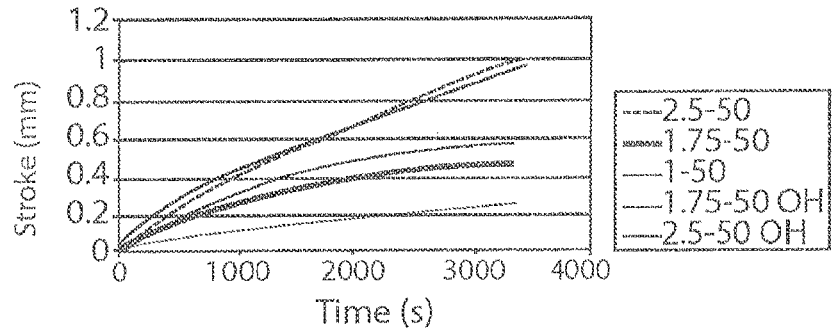
Figure 10:
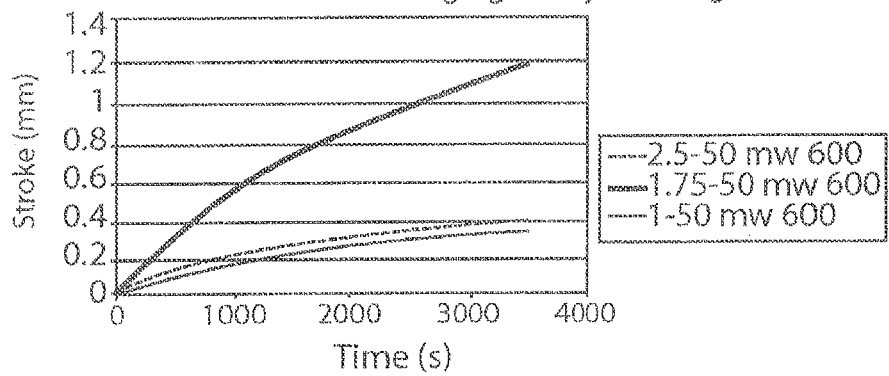
Figure 11:
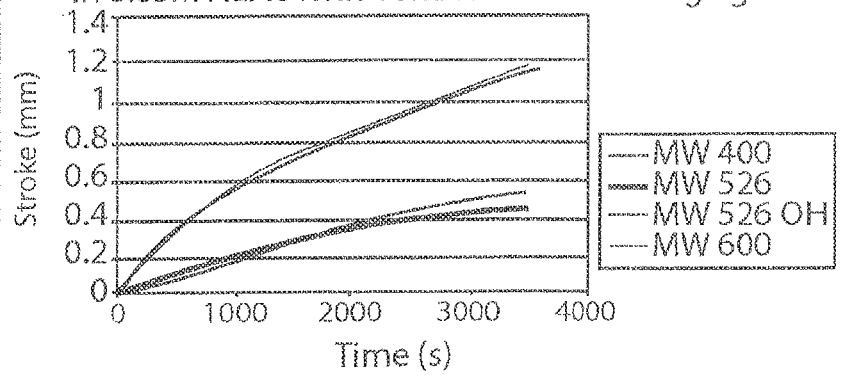
Figure 12:
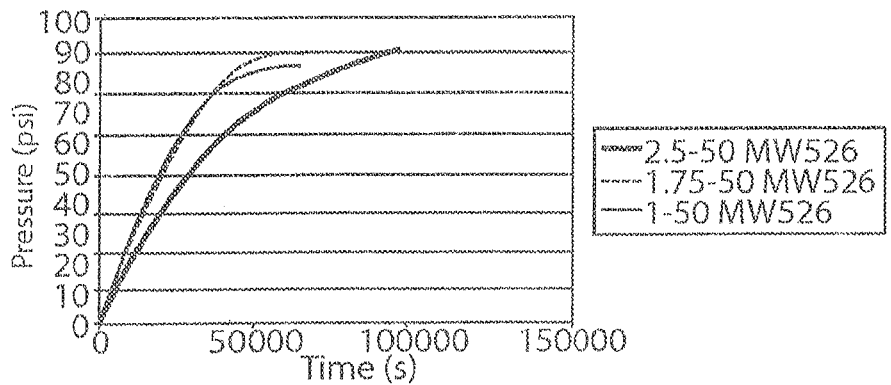
Figure 13:
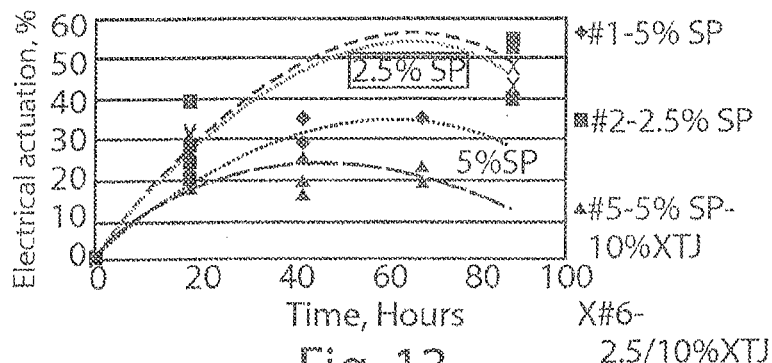
Figure 14:
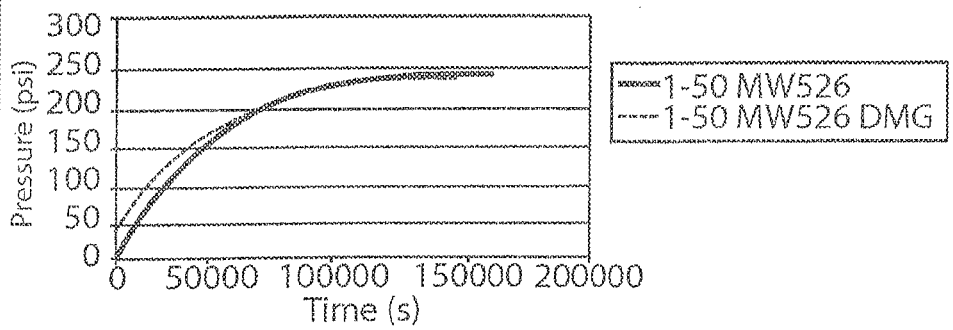

FIG. 6 compares chain linked impact before breakdown of polymers on maximum swelling in ecetic acid;

FIG. 7 is a graph showing passive hydration pressure generation comparison of different chain links with NH/OH;

FIG. 8 is a graph showing speed of stroke comparison of different NH/OH ratios;

FIG. 9 is a graph showing electrically actuated vertical stroke rate of PEGDGE gels with different NH/OH ratios;

FIG. 10 is a graph showing stroke under low comparison of PEGDGE molecular weight 600 for different NH ratio gels;

FIG. 11 is a graph comparing 1.75 NH ratio gels stroke rates under load;

FIG. 12 is a graph comparing electrical activation pressures of different NH ratio gels;

FIG. 13 is a graph showing impact of binders in electrical activity performance at constant amp;

FIG. 14 is a graph comparing a solid disk and Dry Milled Gel; and

FIGS. 15 and 16 are tables comparing Gelation degree and Swelling degree, respectively of the actuators studied.

As used herein the term "smart polymers" are stimuli-responsive polymers that change according to the environment they are in. As applied specifically to the present invention, the smart polymers change in polymer chain length, flexibility and may swell or change shape at varying speeds. Typically, the smart polymers may respond non-linearly, and are reversible.

In one aspect, the claimed invention provides a three-dimensional smart polymer matrix formed by a first epoxy chemical reaction linking a linear polymer chain and a branched polymer chain wherein the polymer chains are flexible and one or more reactive molecule species remain un-reacted, at a predetermined mathematical ratio of reacted to un-reacted molecules and molecule species, and the un-reacted molecular species are available for further chemical reaction after the first chemical reaction, wherein the smart polymer matrix is hydrophilic and non-soluble to a solvent or electrolyte.

A three-dimensional smart polymer matrix formed by a first epoxy chemical reaction linking a linear polymer chain and a branched polymer chain wherein the polymer chains are flexible and one or more reactive molecule species are left un-reacted, at a predetermined mathematical ratio of reacted to un-reacted molecules and molecule species, and the un-reacted molecular species are available for further chemical reaction after the first chemical reaction, wherein the smart polymer matrix is hydrophilic and non-soluble to a solvent or electrolyte.

In yet another aspect of the invention there is provided a three-dimensional smart polymer matrix formed by a first and one or more secondary epoxy chemical reactions wherein the polymer chains are flexible and elastic, and one or more reactive molecule species remain un-reacted, at a predetermined mathematical ratio of reacted to un-reacted molecules and molecule species, and available for further chemical reaction after the secondary chemical reactions, wherein the smart polymer matrix is hydrophilic and non-soluble to a solvent or electrolyte, and at least one of the reacted molecule species of the polymer chains and or linkages exhibit a polar attraction to a solvent or electrolyte, and the ratio of reacted to un-reacted molecular species determines the physical performance of the smart material.

In one embodiment the polymer chains and linkages are flexible and elastic and at least one of the reacted molecule species of the polymer chains and linkage exhibit a polar attraction to a solvent or electrolyte, and the ratio of reacted to un-reacted molecular species determines the physical performance of the smart material.

In another embodiment one or more of the reactive molecule species left un-reacted are available for one or more secondary chemical reactions.

In yet another embodiment one or more of the reactive molecule species left un-reacted and available after the first chemical reaction are available for a secondary reversible chemical reaction with a solvent or electrolyte dispersed within and around the polymer matrix In still another embodiment the solvent or electrolyte contains one or more molecule species that can bond with and reversibly change the molecular charge of a reactive molecule within or around the polymer matrix.

In one embodiment the solvent or electrolyte contains one or more molecule species that can reversibly bond with and reversibly change the molecular charge polarity of a reactive molecule species.

In another embodiment the solvent or electrolyte contains one or more molecule species that can reversibly bond with and reversibly change the molecular charge strength of a reactive molecule species.

In yet another embodiment, the solvent or electrolyte contains one or more molecule species that can reversibly bond with and reversibly change the molecular charge of a reacted molecule species.

In still yet another embodiment the solvent or electrolyte contains one or more ion species.

In another embodiment, the solvent or electrolyte has more than one pKa value or dissociations.

In another embodiment the chemistry of the solvent and or electrolyte are sensitive to change as a result of an external energy stimuli.

In yet another embodiment the chemistry of the polymer matrix reactive molecule species is sensitive to change as a result of an external energy stimuli.

In still another embodiment the polymer chain lengths of the linear polymer chains are random within a range and determine the maximum swelling size of the polymer matrix.

In another embodiment the polymer chain lengths of the linear polymer chains are random within a range and a mixture of two or more linear polymers, and wherein the linear polymers are hydrophilic or a combination of hydrophilic and hydrophobic polymers.

In yet another embodiment the polymer chain of the linear polymer are assembled block polymers of two or more polymers and are random in length within a range.

In still another embodiment the polymer chain lengths of the branched polymer are not random.

In another embodiment the polymer chain lengths of the branched polymer are random within a range.

In yet another embodiment the polymer chain lengths of the branched polymer are assembled block polymers.

In still yet another embodiment the branched polymer component with one or more reactive molecule species comprises dendrimers, hyperbranched polymers or a combination of one or more of these with branched polymers.

In a preferred embodiment one or more of the components of the first epoxy chemical reaction is selected from the group consisting of a polyethylene glycol diglycidyl ether, polypropylene glycol diglycidyl ether, a polymer having an ionic functional group selected from the group consisting of carboxylic acid, phosphoric acid, sulfonic acid, primary amine, secondary amine, tertiary amine, and ammonium, acrylic acid, methacrylic acid, vinylacetic acid, maleic acid, metakuriro yloxy ethylphosphoric acid, vinylsulfonic acid, styrene sulfonic acid, vinylpyridine, vinylaniline, vinylimidazole, aminoethyl acrylate, methylamino ethyl acrylate, dimethylamino ethyl acrylate, ethylamino ethyl acrylate, ethyl methylamino ethyl acrylate, diethylamino ethyl acrylate, aminoethyl methacrylate, methylamino ethyl methacrylate, dimethylaminoethyl methacrylate, ethylamino ethyl methacrylate, ethyl methylamino ethyl methacrylate, eiethylamino ethyl methacrylate, aminopropyl acrylate, methylaminopropyl acrylate, dimethylaminopropylacrylate, ethylaminopropyl acrylate, ethyl methylaminopropyl acrylate, diethylamino propylacrylate, aminopropyl methacrylate, methylaminopropyl methacrylate, dimethylaminopropyl methacrylate, ethylaminopropyl methacrylate, ethyl methylaminopropyl methacrylate, polymers, such as diethylamino propyl methacrylate, dimethylaminoethyl acrylamide, dimethylaminopropylacrylamide, and an akuriroyloxy ethyl trimethylammonium salts, polybutene, a silicone, a silsesquioxane oligomers, an amino functional silicone or siloxane, a silanol functional polymer, a hydrosiloxane, a carbinol functional silicone, an anhydride functional silicone, a bicycloheptenyl functional silicone, a carboxylate functional silicone, a polymeric metal alkoxide, a hydroxyl functional silicone, a polysilsequioxane, and a combination thereof with a functional epoxy groups.

In another preferred embodiment one or more of the components of the first chemical reaction is selected from the group consisting of a branched polyethylene oxide, polyethylene glycol, polypropylene oxide, polypropylene glycol, silicon, a polysilsequioxane, a multifunctional siloxane, polybutene or another flexible polymer with a terminal amine, carboxyl, hydroxyl or other functional unit.

In a preferred embodiment the polymer matrix gel of the present invention has a degree of gelation of below 98%, more preferably below 90% and even more preferably between 75 and 85%.

In yet another embodiment one or more non linking polymers or macromolecules with reactive molecule species are entangled, trapped within and around the polymer matrix and not linked to the polymer matrix after polymerization and are available for chemical reaction.

In still another embodiment one or more non linking polymers or macromolecules with reactive molecule species are entangled, trapped within and around the polymer matrix and partially linked at one or more molecular sites to the polymer matrix after polymerization and are available for chemical reaction.

In still yet another one or more non linking polymers or macromolecules with reactive molecule species are entangled, trapped within and around the polymer matrix and partially linked at one or more molecular sites to the polymer matrix after polymerization and are available for chemical reaction.

In another embodiment one or more reactive molecule species available for chemical reaction determine the pressure generation of the polymer material.

In yet another embodiment one or more reactive molecule species available for chemical reaction determine the pressure generation of the polymer actuator and the surface area determines the speed.

In yet another embodiment one or more reactive molecule species available for chemical reaction determine the pH range of one or both of the passive and active swelling generation of the polymer material.

Figure 1:
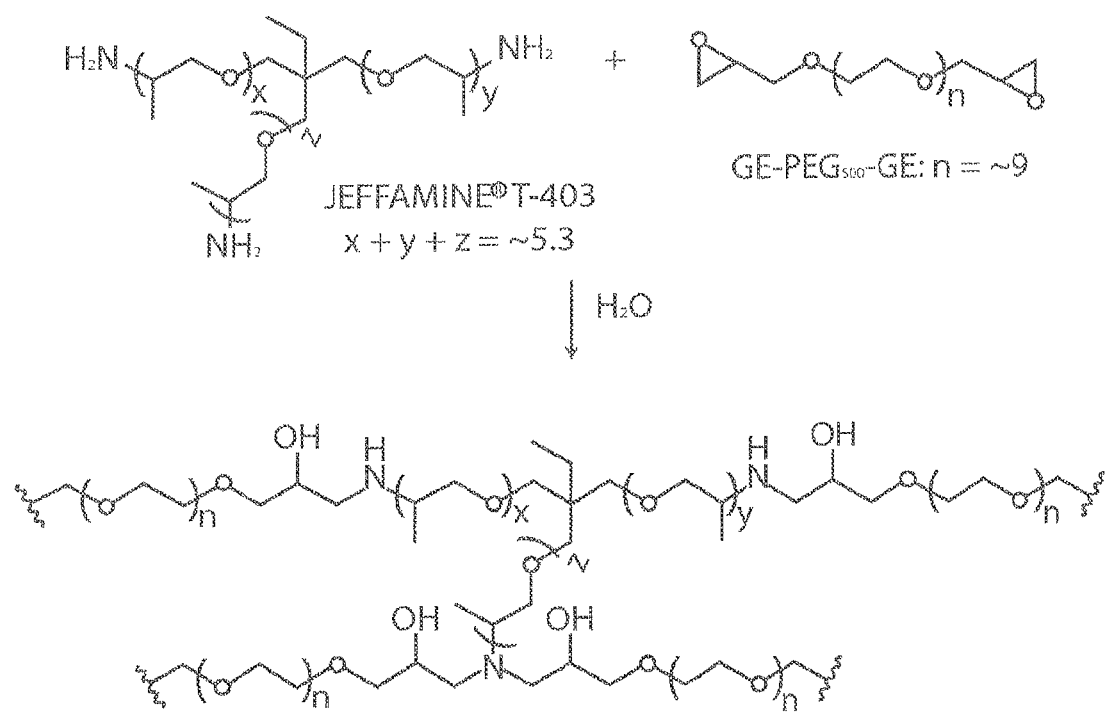
FIG. 1 illustrates a schematic route of gel synthesis of Jeffamine T-403 polyethylene glycol deglycidyl ether and water.

Amine-cured epoxy networks are formed from the amine hydrogen-epoxide reaction which is shown in FIG. 1. I. The —$CH_3$ group closest to the $NH_2$ group in T-Jeffamine will produce a steric interference to slow the reaction rate of the secondary amines as compared to the non-reacted primary amines[2,3,4,5]. Therefore, the polymer matrix ends up with a ratio dependent (amine/epoxide) combination of primary and secondary amine hydrogens on the final network.

A. Equilibrium Swelling and Electrolytic Actuation Mechanics of Amine Epoxy Gel It is important to understand the role the electrolyte or a solvent plays in a hydrogel swelling process. Due to the interconnections between the polymer chains, the cross-linked polymers are insoluble but the structure will uptake a solvent or electrolyte and expand the polymer matrix to the extent that it will allow. If the affinity of the electrolyte or solvent for the molecular sites is stronger than the polymer chains or crosslink bonding then the structure can fracture or decompose reducing the force of the actuator material.

The solvent or electrolyte is attracted to the reactive molecular units on or within the polymer matrix and can remain within the polymer structure in what is typically cited as three states: bound, unbound and free. The strength of each of these interactions varies according to the molecule and its interaction with the solvent or electrolyte, so it is possible to have a combination of several variants of the bound unbound and free states occurring in simultaneous dynamic action[6]. When charge is introduced to the matrix by protons generated by electrolytic breakdown of the solvent at the electrodes, the solvent or electrolyte in and around the polymer gel will be attracted to, or repulsed from, the polymer matrix according to the strength and density of the charge. Since the molecular sites in the matrix have differing strengths, and therefore different protonated states at equilibrium, it is possible to regulate the volume, speed and force of the swelling/deswelling process via proton injection or ion concentration.

For this study of the epoxy amine gel we used only one supporting electrolyte, aqueous sodium acetate, and looked at the impact that electrolyte concentration had on the swelling characteristics with each change in the polymer/molecule matrix. From this we developed a linear model of the amine epoxy gel's mass volume change in relation to the salt concentration. To reach swelling equilibrium upon hydration the polymer-water interaction of the mixing uptake phase generates osmotic pressures $P_{mix}$ acting expansively. Due to the polymer-polymer interactions the polymer network counteracts this expansion by an elastic force respected by $-P_{elast}$. The contribution of molecular electrostatic interaction to balance the osmotic pressure has to be represented as an expansive pressure $P_{ion}$. The epoxy-amine gels obtain swelling equilibrium at the balance of three pressures[7,8] which can be described by Equation I.

$$P=(P_{mix}+P_{ion})-P_{elast} \quad \text{Equation I}$$

The epoxy-amine gels comprise weak base groups such as NH and $NH_2$ that can be protonated. The polymer gels also contain hydroxyl (OH) and ether (O) units that form hydrogen bonds easily with water (Equation III—$H_2O$ route). As water enters the matrix and creates hydrogen bonds at the O and OH and NH sites the H bonded water molecules also contribute to this process by providing another three, possible H bonding sites[9,10] each, and each of these H bonded waters can perpetuate three more H bonds with each new water molecule (Formula I). Therefore, the density of the water charged groups within the network strongly increases upon aqueous hydration. Once the gel reaches equilibrium of hydration it can be further expanded by an adequate generation of mobile counter-ions inside the gel (Equation II—NaAc current route), which induces the phase transition due to electrostatic repulsion and the polymer gel is forced to increase its swelling volume.

Formula I

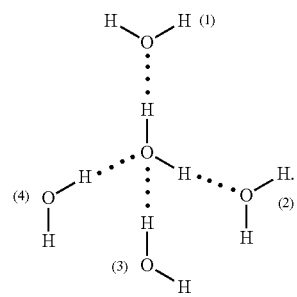

Multiple hydrogen water bonding

The primary and secondary amine groups and the hydroxyl groups are electron rich and easily form hydrogen bonds with water molecules, this is demonstrated in hydration study results later in the paper. In an aqueous media an equilibrium exists (Equation II) between the free amino groups and their protonated forms.

$$R-NH_2 + H_2O \leftrightarrows [R-NH_3]^+ OH^- \quad \text{Equation II}$$

When applying a DC current to a hydrated gel, the region near the anode, in an aqueous electrolyte cell, becomes more acidic as oxygen is released and protons are formed in solution, according to Equation III.

$$2H_2O \rightarrow O_2 + 4H^+ + 4e \quad \text{Equation III}$$

The region near the cathode becomes more basic according to Equation IV.

$$2H_2O + 2e \rightarrow H_2 + 2OH^- \quad \text{Equation IV}$$

Figure 2:
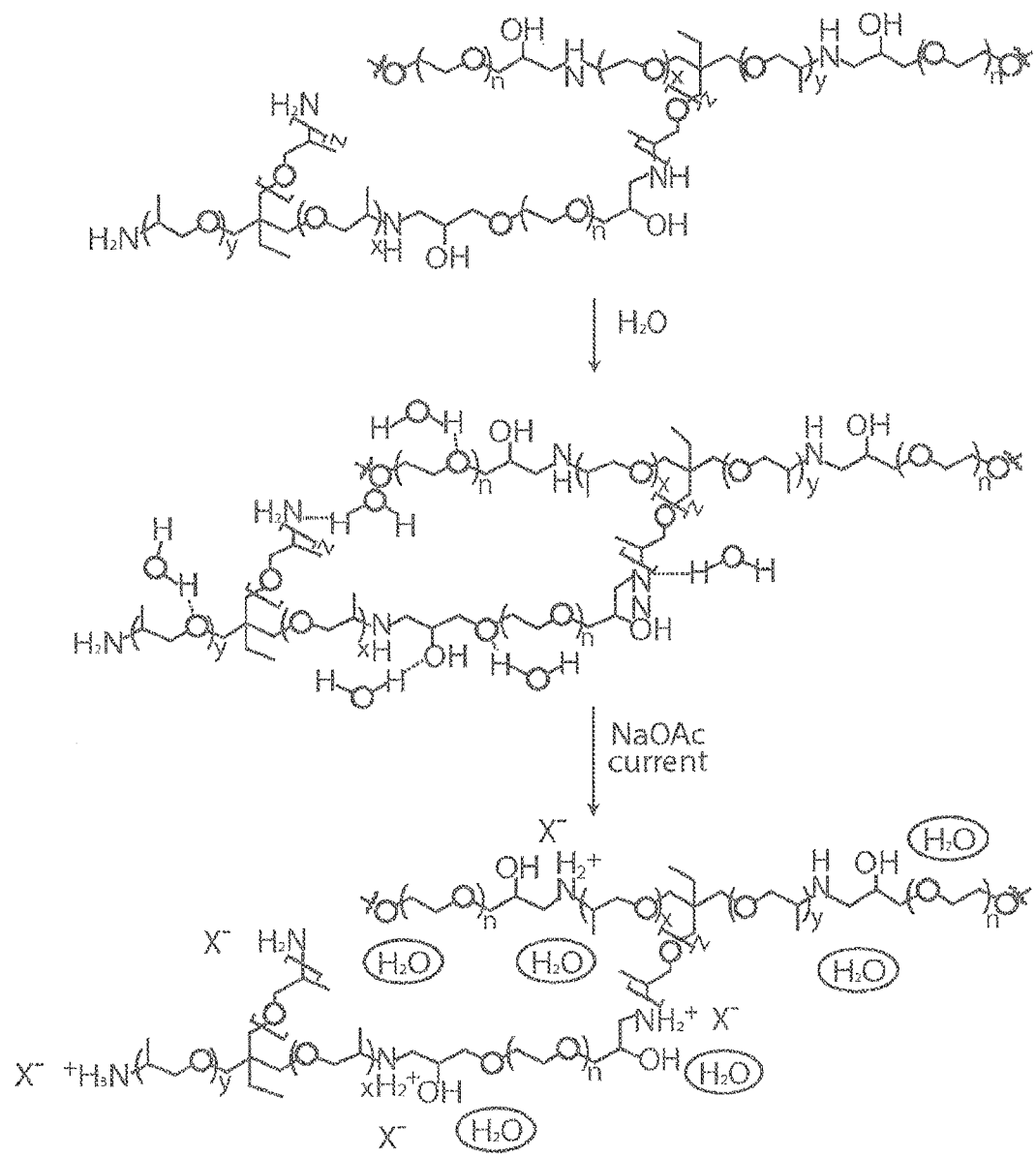
FIG. 2 illustrates hydration and electrolytic route to gel expansion with sodium acetate.

During the water electrolysis from the applied current, localized pH gradients are generated near both of the electrodes. At low pH, nearby the anode, the protons enter the matrix, making positively charged ($-NH_3^+$), this disturbs the electro-neutrality of the polymer gel. To balance the charge, anions enter the polymer gel matrix along with the solvent (FIG. 2—the current route, which shows hydration and electrolytic route to gel expansion with sodium acetate. It is important to note that a different electrolyte such as sodium bicarbonate will produce negative electrostatic force repulsion). This causes increased swelling, added to this a large amount of ionic repulsion occurs at a higher concentration of $NH_3^+$ ions, thereby physically forcing the gel matrix to open and swell allowing an increase in water to water bonding. The epoxy-amine polymer gel contraction or expulsion of fluid occurs at higher pH, in the vicinity of the cathode a reversible process takes place where the hydroxyl ions are created, and the gel shrinks. Simply explained the swelling/shrinking of these epoxy-amine gel actuators works by changing the pH concentration of the solution. This is determined by the electrolyte (sodium acetate), current charge, time and polarity of the electrode.

Figure 3:
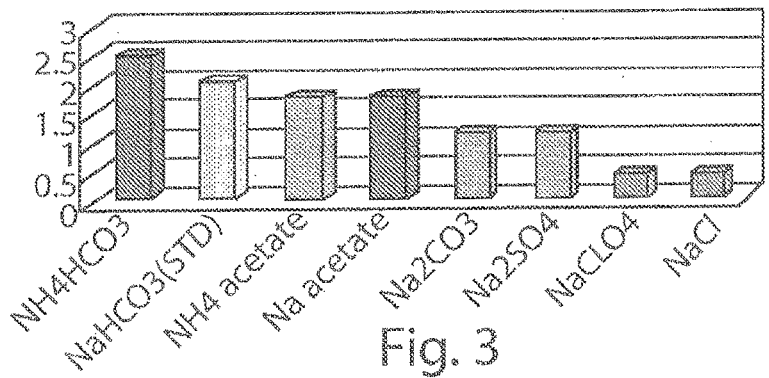
FIG. 3 shows stroke rate comparison, of different electrolytes, using one polymer actuator formulation.

The results of our study indicate that the amine epoxy gels are highly conducive to materials engineering. The performance of the polymer gel actuator can be incrementally adjusted by changing the following formulation parameters; polymer crosslink density, polymer chain length, degree of polymer gelation, ratio of reactive molecular units, and binding materials. Solvents and electrolytes also play a very important role in the polymer actuation as shown in FIG. 3, so much so that for the purpose of this study the electrolyte concentration was fixed at one concentration in aqueous solution so that the impact of each change made to the polymer material showed as a direct change in the performance of the actuator. Electrical actuation experiments where conducted using an aqueous sodium acetate electrolyte at salt concentration of 0.05 m and passive swelling tests were conducted using 3 aqueous solutions, 0.05 m acetic acid, 0.05 m sodium acetate and DI water. All gels were tested by mechanical tensile tests, hydration swelling change of mass and swelling performance via electrical current over time. Rates of actuation strain both free standing and weight loaded, as well as force generation over hydration time and actuation time were recorded. The formulation was then altered to generate a range of reactive NH to OH molecule ratios from an excess of 2.50H/1.0 NH to 2.5NH/1.0 OH according to the following studies and results.

Figure 4:
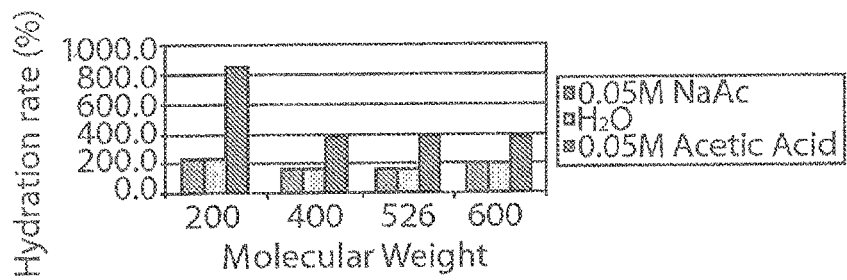
FIG. 4 shows passive swelling of NH/OH 1.0 ratio gels with varying molecular weight PEGDGE.
Figure 5:
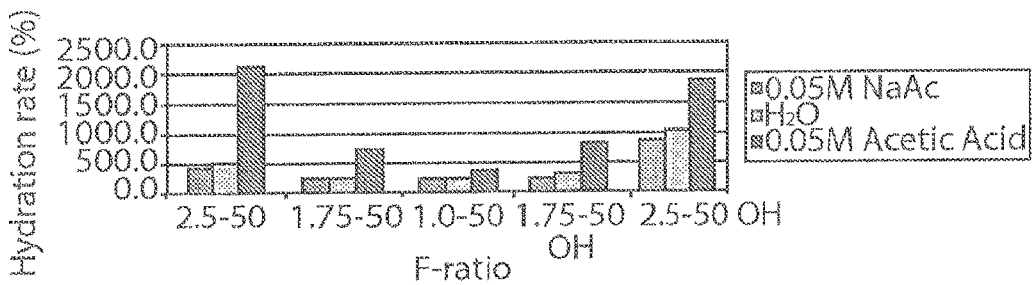
FIG. 5 shows hydration of actuator gel formulas with an average PEGDGE chain length with varying ratios of reactive molecular NHNOH ratios.

Passive Aqueous, Electrolyte and Acidic Swelling and Diffusion of Amine Epoxy Gel Passive hydration tests were accomplished using cured cylindrical polymers that were cast in machined molds to provide a uniform sample size of the polymers. Polymer gels were formulated with an equal ratio of NH to OH molecules or an f ratio of 1.0 to 1.0 using Jeffamine and PEGDGE 200, 400, 526, and 600 molecular weights. The gels were allowed to swell for 72 hours. The gel cylinders showed expected results, with one exception, as shown in FIG. 4, demonstrating incremental increases in swelling sizes that corresponded with increases in the chain length of the PEGDGE component. The 200 mw gels at the f 1.0 ratio showed increased swelling over the rest of the higher molecular weight gels. It is not understood why there was this difference with the 200 mw gel.

When a comparison of how the NH/OH ratio affects the passive swelling of actuator gels with Jeffamine and a single PEGDGE chain length was performed, the data supports the correlation of NH/OH ratios impacting swelling results as shown in FIG. 3. Actuator gels were formulated with PEGDGE 526 mw and the ratio changes produced higher overall swelling with increased ratios. The study also importantly shows that the water swelling of the gels increased significantly with an increase in OH units, where the higher NH ratio gels showed much less swelling in water and a much higher 4× difference between the water and acid swelling at the higher NH ratio suggesting less water bonding until the acid protonated state of the NH units. This clearly demonstrates the high degree of impact a change in reactive molecular ratios can accomplish in the overall swelling performance of an actuator material.

B. Polymer Crosslink Density

It has been demonstrated in other studies that dendritic components lend certain desirable characteristics to polymeric networks within which they are incorporated. For example, (a) dendrimers can increase the permeability of a dense crosslinked network, and this can be exploited for sensor applications;[17,18] (b) the mechanical properties and water content of a hydro gel can easily be tuned by changing the dendrimer concentration;[12] (c) PAMAM dendrimers in hydro gels impart increased hydrophilicity[9] which may increase proton conductance through the hydro gels; and (d) properties of hydro gels that incorporate PAMAM are largely dependent on the properties of the other component of the hydro gel polymer.[9] Literature suggests that hydro gels crosslinked with dendrimers do not show a significant decrease in their ability to swell as a function of increased crosslinking.

We investigated the mechanical performance effects both dendrimers and hyperbranched polymers had when incrementally added into the amine epoxy formulation. In addition, using dendrimers or hyper branched polymers allowed measured increase in concentration of ionizable amine groups to the amine epoxy gels. We theorized this would increase the performance aspects of the amine epoxy gel actuators.

Dendrimers are symmetric, highly branched, synthetic macromolecules as shown in Formula II. Advantages of dendrimers for hydrogel formation include high crosslinking densities at low polymer concentration, systematic control of physical properties through structural variables provided by the dendrimer and low viscosity of precursor solutions for pre-processing. For this portion of the study, we incorporated both PAMAM and DAB dendrimers from generations 0, 2 and 3.

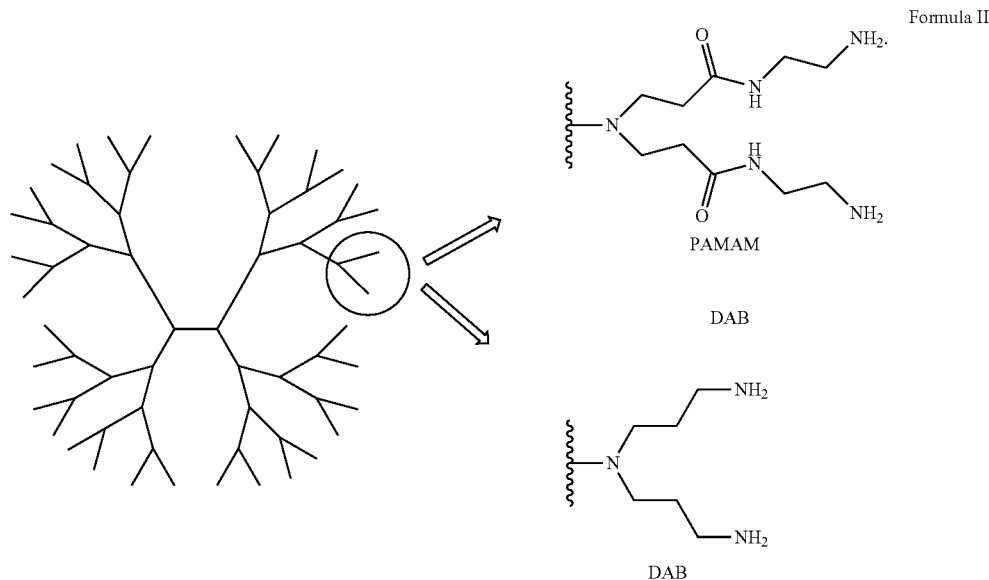

Symmetrical dendrimer structure with both PAMAM and DAB end groups shown.

We prepared amine-epoxy hydrogels fabricated from GE-PEG$_{500}$-GE, Jeffamine T-403 and dendrimers DAB-Am-8, DAB-Am-16, PAMAM-8, PAMAM-16, SP-012 and XTJ-582 in separate formulations. The ratio of NH to epoxide previously determined to give optimal performance and stability characteristics to our amine epoxy standard gel formulation without dendrimer is 2.67:1. Hydrogels having this formulation are called the standard gels (gel-1). Amine epoxy gel formulations where the NH to epoxide ratio remains 2.67:1 but the amount of water used is doubled and tripled are the $X_2$ and the $X_3$ gels respectively (gels 2-3). Two generations of DAB and PAMAM dendrimers were investigated in the formulations for the hydrogel actuators. They are generation 2.0 and 3.0 with 8 and 16 amine residues on the periphery respectively. The volume fraction of Jeffamine T-403 was systematically replaced with dendrimer over several increments, whereas the ratio of NH to epoxide was maintained at 2.67:1 (gels 4-1 1). The critical parameter that distinguishes these dendrimers is the number of amino residues on the surface, which is indicated in the designation of these compounds. We have also characterized these gels in terms of equilibrium swelling characteristics and gelation degree. The dendrimer formulations studied during this period probed the increase of dendrimer composition with a decrease in Jeffamine T-403 composition by one third, while NH to epoxide ratio was maintained at 2.67:1 throughout the entire formulation.

As we studied the effect of dendrimer or hyperbranched polymer crosslinking agents on amine epoxy gels performance, we assayed actuation response, increased hydrolytic stability, and longer cyclical lifetimes. In general, higher crosslink density leads to enhanced mechanical properties and significant reduction in network breakdown. The well-defined structure of dendrimers, with the number (density) of the junctions and their chemical composition easily controlled, should lead to more reproducible properties and responsive behavior of the resulting hydrogels, allowing a systematic study of structure-property relationships and subsequent materials optimization.

Our study indicates that introducing the dendrimers in the PEGDGE/Jeffamine formulation also increases mechanical stiffness thereby reducing the gels flexibility as shown in Table 1. The dendrimer structures also play an important role in improving the gels strength at a higher $NH_2$ to epoxide ratio. Shaped gels were formulated and mechanically tested, and the results are reported below in Table 1.

TABLE 1

Mechanical test results showing effects of adding dendrimers, hyperbranched, elastomers and binders to the base gel formulation. Gels that remained intact with no break either had elastomers or binders added over 36 formulations were tested.

| Sl. No | Gel Sample | Elastic modulus (MPa) | Fracture Strength (MPa) | Strain to Break |
|---|---|---|---|---|
| 1 | Base | 1.31 | 0.3286 | 0.26 |
| 2 | Base + 10% XTJ elastomer | 0.999 | no break | no break |
| 3 | X2 | 0.664 | no break | no break |
| 4 | SP-012 | 1.74 | 0.383 | 0.219 |
| 8 | 0.1802 DAB-8 | 8.53 | 1.905 | 0.281 |
| 13 | 00901 DAB-16 | 7.73 | 1.508 | 0.261 |
| 18 | 01802 PAMAM-8 | 6.1 | 1.834 | 0.343 |
| 19 | 10% XTJ + 0.0902 PAMAM-8 | 2.84 | 0.6069 | 0.238 |
| 23 | 00901 PAMAM-16 | 9.059 | 1.878 | 0.23 |
| 24 | 10% XTJ + 0.0451PAMAM-16 | 4.14 | 1.006 | 0.253 |
| 25 | 0.361 SP-012 | 2.89 | 0.26 | 0.10 |
| 28 | 1.441 SP-012 | 11.37 | 1.71 | 0.18 |
| 29 | PolyEDGE + JT-403 + 0.476Ethyleneimine-1300 + 7.16 Carbon + H$_2$O | 6.34 | no break | no break |
| 32 | PolyEDGE + 0.307Ethyleneimine 1300 + 7.16 Carbon + H$_2$O | 2.84 | no break | no break |
| 33 | PolyEDGE + JT-403 + 0.363Ethyleneimine-1300 + 7.16 Carbon + H$_2$O | 3.40 | no break | no break |

The addition of dendrimers do impact the gels total size swelling ability as shown data presented in FIG. 4. This made sense when put into the following mechanical metaphor, a cross section of organized dendrimers are similar to the way a bicycle wheel is, where the spokes create stiffness and hold the shape of the circular wheel, just like a wheel the dendrimer imparts strength, but not flexibility. Hyper branched polymers on the other hand are typically non symmetric molecular constructions having a branched structure, generally around a core. Their structure is typically fan shaped and the base units or monomers used to construct the hyper branched polymer can vary and their distribution is non-uniform. The branches of the polymer can be of different natures and lengths therefore imparting flexibility, we also studied integration of several molecular weights of poly ethyleneimine hyperbranched polymers such as SP-012 shown in Formula III.

of the polymer gel, we theorized that adding a longer chain elastomer would improve the higher crosslinked dendrimer-containing gels' degree of swelling and mechanical properties of the hydrogels. This proved to be successful. XTJ-582 is a polyetherdiamine of about the same weight as JT-403 with a lower level of unconverted hydroxyl groups than the standard Jeffamine D-400 polyetheramine. The polyether backbone contributes flexibility to the hydrogel. We systematically replaced 10% of the JT-403 with XTJ-582 in both base gel and dendrimer-containing gels. FIG. 6 shows a comparison of the water swelling properties of the dendrimer hydrogels with incorporation of XTJ-582. With the increase in DAB-8, DAB-16, PAMAM-8, PAMAM-16 and SP-012 dendrimer content in the gel, the elastic modulus and fracture strength increases and Strain to Break decreases.

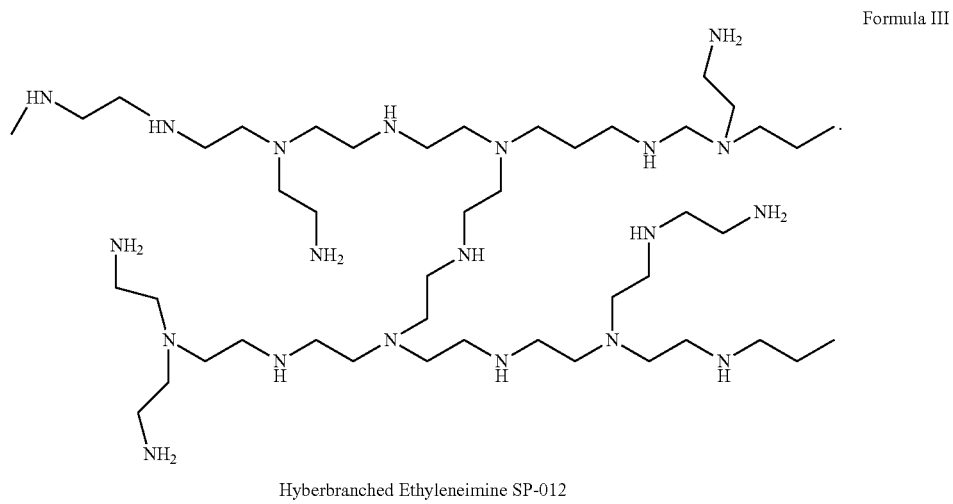 [SMILES: CCCNCCN(CCNCCN)CCNCCN(CCNCCN(CCN)CCN)CCNCCN(CCCNCN(CCC)CCN)CCNCCN(CCN)CCNCCNC]

Hyberbranched Ethyleneimine SP-012

Formula III

Hyper branched polymer SP-012 is not entirely linear polymer but partly branched polymer (Formula VI), containing primary, secondary and tertiary amine residues. It is a water soluble polymer which by polymerization of Jeffamine with polyethyleneimine produces a hydrogel. The hydrogel formulation wherein 10% of the Jeffamine T-403 weight was replaced by hyper branched dendrimer SP-012 was formulated. The molecular weight of the SP-012 is 1200 and it has an average of 19 NH residues on its periphery. The epoxide/NH ratio for the above formulation is calculated to be 1:3.4. The hydrogels with hyper branched dendrimer SP-012 incorporated demonstrated good swelling properties when compared to the dendrimer containing formulations of the hydrogel using DAB and PAMAM as shown in Table 1. They also showed a fairly good tensile strength in comparison to the standard gels. Table 1 shows the tensile test results of samples of the gels made from the hyper branched and dendrimer formulations in comparison to the standard gel. The following trends were observed when the amount of SP-012 was increased systematically. With the increase in SP-012 content in the gel, the elastic modulus and fracture strength increases and Strain to Break decreases. Incorporation of 10% XTJ-582, a linear telechelic diamine, in the hyper branched formulations greatly reduces the elastic modulus and increases the elasticity.

C. Polymer Chain Length

The polymer chain length and elasticity sets the stage for the polymers ultimate strength, flexibility and swelling size of the polymer gel, we theorized that adding a longer chain The higher the generation of dendrimer, greater is the increase in the elastic modulus. Our results show that incorporation of 10% XTJ-582 elastomer in the dendrimer formulations greatly reduces the elastic modulus and increases the elasticity as shown in Table 1. XTJ elastomer, added incrementally also impacted the degree of actuation performance in the gel Incorporation of 6% XTJ-582 produces a relatively soft highly elastic gel. Several other elastomers could be considered in future in order to improve the mechanical properties without compromising the elasticity of the polymer matrix. Gel composition additives including the water amount, curing temperature and time all impacted the crosslink density and the gel elasticity.

In the passive swelling test comparing the Jeffamine and PEGDGE gels, the data for the acetic acid the trend shows that the longer the chain length the larger the swelling. The data shows that the reactive molecule ratio has significant impact and needs to be taken into account as the force generated internally can eventually degrade the integrity of the polymer matrix as shown in the maximum swell rates in FIG. 6 many of the gels broke apart after just a few hours limiting the results, the 200, 400 and 600 PEGDGE accounting for the different scales per chain length. The 200, 400 and 600 are from one supplier and the 526 is from another, this probably accounts for the different stability results at maximum swelling the 526 proves to be extremely stable in all hydration states.

D. Polymer Gelation

One methodology of assessing the integrity and quality of the hydrogel is the measurement of the gelation degree (G) and degree of swelling (Q), which was conducted as follows. The mass of the actuator was taken after it had been cured and air-dried to constant mass (m). The actuators were then placed in distilled water and allowed to soak until they reached an equilibrium and constant mass ($m_h$). The swollen actuators were then removed from the water bath and allowed to air-dry until they reached constant mass ($m_d$). Gelation degree (G) and swelling degree (Q) were then measured as follows:

$$G = m_d/m * \cdot 100\%$$

$$Q = 1 + \rho_{gel}(m_h/m_d * \cdot \rho_{H2O} - 1/\rho_{H2O}) * \cdot 100\% \quad \text{Equation V}$$

where $\rho_{gel}$ is the density of the gel after re-drying and $\rho_{H2O}$ is the density of water. FIG. 15 shows the gelation degree and FIG. 16 shows degree of swelling in water for several of the actuators studied. Some significant trends are evident. Increasing the amount of water in the formulation (base gel→$X_2$→$X_3$) results in a dramatic increase in Q. Changing the nature of the dendrimer from DAB to PAMAM and also the generation from 2 to 3 results in an increase in G and a decrease in Q, presumably because of higher crosslinking density introduced with increasing generation. Also, for the same generation dendrimer, when the ratio of Jeffamine to dendrimer decreases, we see an increase in G and decrease in Q for the same reason.

The amine epoxy gels formulated with the hyper branched ethyleneimine also show the impact of gelation on the gels overall swelling characteristics. From both the dendrimer and hyperbranched polymer data we can conclude that increasing the crosslink density strengthens the gel significantly. This strengthening impacts the ability of polymer matrix to physically expand, and the higher the gelation coefficient, the less the hydrogel is able to freely expand during hydration, as evident when comparing FIGS. 15 and 16 where the lowest gelation degree shows the highest swelling.

E. Type and Density of Reactive Units

To see the impact of the reactive molecule groups we conducted two avenues of study, since the swelling kinetics on the amine epoxy gels is determined by the molecular charge attraction and the density of those charges, the amine to epoxide ratio was incrementally increased and decreased to show what effect a higher density of primary amines or hydroxyl units would have on the actuation performance, both by stroke performance under a set load of 0.7 psi and then by speed of total force generated. Another aspect we show is the impact chain length has on pressure generated, since there are water attachment O sites on PEGDGE chains there should be a change in pressure this is seen when two different chain lengths are used with an equal NH/OH ratios as shown in FIG. 7.

In order to see the impact of changing the ratio of the hydroxyl units to amine units by increasing the density of hydroxyl units within the gel we used a polyester hyper branched chain with 32 hydroxyl units on the periphery with a ratio of amine to epoxide units of and collected passive as well as electrically activated swelling data on each. First, the impact of the NH/epoxide ratios on passive swelling and electrical actuation, we started the study using PEGDGE 526, at the 2.67 ratios, but found when we tried to incorporate the other molecular weight PEGDGE's i.e. 200, 400, 600 mws the gels would not polymerize at the higher amine ratios. We then incrementally reduced the NH/epoxide ratios to reach the 2.5 NH/OH, 1.75NH/OH, and 1.0/1.0 NH/OH. The trend indicated that the higher OH gels initial hydration was faster but produced less force overall while the higher NH gels initial hydration was slower but produced higher forces overall and were able to test force generation over time, as shown in FIG. 8.

To allow for an apples to apples comparison of the NH and OH ratios, we formulated the five series of gels shown as 2.5 NH/1.0 OH, 1.75 NH/1.0 OH, 1.0 NH/1.0 OH, 1.75 OH/1.0 NH and 2.5 OH/1.0 NH. Positive results of higher and faster electrical actuation under load according to NH/OH ratios where obtained from the Jeffamine and PEGDGE 526 gels having incremental ratio increases of the excess reactive molecules as shown in FIG. 9.

Actuation stroke rates of the PEGDGE 526 gels in FIG. 9 showed that at each of reactive molecule ratio increments the gels performance aligned with the other corresponding molecular ratios. The 1.0 NH/1.0 OH demonstrated lowest stroke while the 2.5 NH/1.0 OH and 2.5 OH/1.0 OH ratios showed the highest.

When incorporating higher NH ratios into the PEGDGE 600 gels, passive swelling produced very large but not structurally sound material and it become more gelatinous, this had a very negative impact on the stroke performance under load and as shown in FIG. 8 when tested the 2.5NH gels did not perform nearly as well as the 1.75NH 600 gels. The same held true for the PEGDGE 400 gels and both of the PEGDGE 400 and 600 gels performed best under electrical activation in the 1.75NH formulations as shown in FIG. 9.

Pressures generated under electrical activation also show agreement with the same electrical stroke trends with the higher NH ratio gels attaining the higher forces in line with the results in FIG. 9. FIG. 12 shows maximum pressure generated under electrical current to date on the PEGDGE 526 gels with the 2.5 NH/OH gels attaining the highest pressure and the 1.0 NH/OH gels. Thus, it would appear that eventually the electrically activated gels should be able to match the force generated by the passive swelling gels.

F. Binders Role in the Polymer Matrix

The standard amine epoxy gel without a binder is quite fragile upon hydration and the stress of the actuation strains over 200% can cause gel fracture. To eliminate this problem several materials with binding properties were investigated. At first a few types of fiber fillers were tried such as glass and chopped carbon all of which resulted in very poor results of passive swelling. Then we tried high surface area milled carbons which produced very acceptable swelling results as shown in FIG. 13. The binder does not produce a negative force such as an elastomer but it does act as a static force that has to be overcome by the forces of swelling, the increase in binder equals a stronger material that takes more force to actuate. Therefore it is possible to find an optimum balance for activation response and structural integrity for a polymer actuator that is dependent on the crosslink density, elastic forces, density of reactive molecules, ion concentration and current density used to actuate the material and the desired structural configuration of the actuator. The binders static force does not seem to be countered by adding elastomer as shown in FIG. 13 as the percentage of carbon binder was increased we systematically added elastomer this negatively impacted the performance in the higher binders concentrations were in the lower binder concentrations the elastomer did not make as large a difference.

The invention will now be illustrated with reference to the following working examples.

I. Materials

Poly (ethylene glycol) diglycidyl ether PEGDGE 200,400 and 600 mw available from Poly Sciences; Poly (ethylene glycol) diglycidyl ether PEGDGE 526 the DAB and PAMAM dendrimer, Ethyleneimine, hyperbranched polyester, Nanoclay, Nanomer 1.30E, clay surface modified available from Sigma-Aldrich; JEFFAMINE T403 available from the Huntsman Chemical Company; and Printex conductive carbon black available from Degussa were assembled. Deionized water was used for all experiments. Teflon gel molds for gel casting were made in house.

II. Preparation of the Gels

The hydrogels were prepared by reacting the crosslinking agent JEFFAMINE T-403 with PEGDE. The binders and water were added to the mixture subsequently. These materials were kept at the same percent for all gels. The JEFFAMINE T403 and the POLYEDGE percentage varied depending on the studied ratios between them. The standard gel of NH 2.67 contained JEFFAMINE T-403 and PEGDGE 526. This composition was used for some of the presented data. After the gels are cast they were cured for 5 hours at 60 C and dried for 48 hours at room temperature.

Solid gel discs and dry milled (DMG) high surface area gels were tested for stroke rate and force generation, and the results shown in FIG. 12, which indicate the pressure produced is the same by both only the speed is affected by the change in surface area. All pressure and stroke data was performed with the Dry Milled Gel (DMG).

To formulate the high OH ratio actuator gels hyperbranched polyesters with 32 OH units on the periphery of the polyester chain (Formula VII) were incorporated into the gel formulation. Hyperbranched polyesters are related to dendrimers in their fundamentally branched architecture. However, the branching is not perfectly regular, and the materials have a structural and molecular weight polydispersity more typical of conventional polymers.

Formula VII

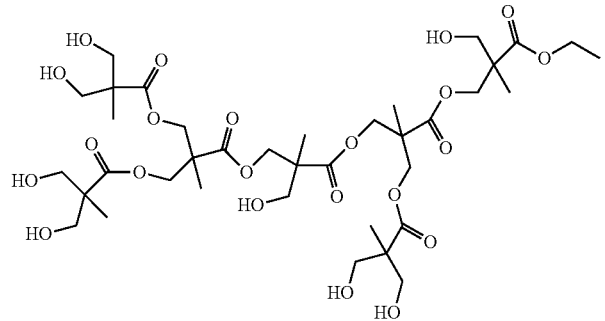

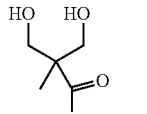
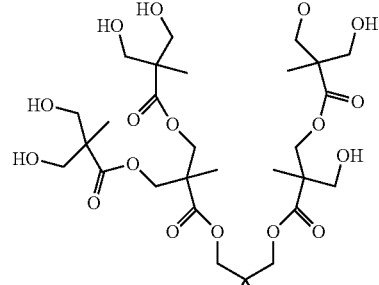
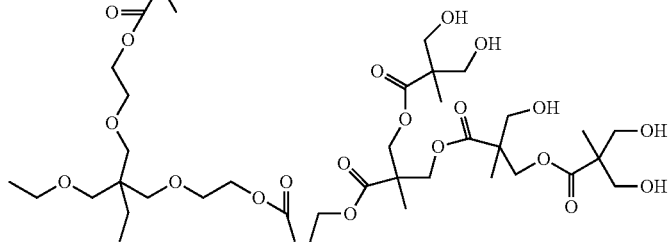

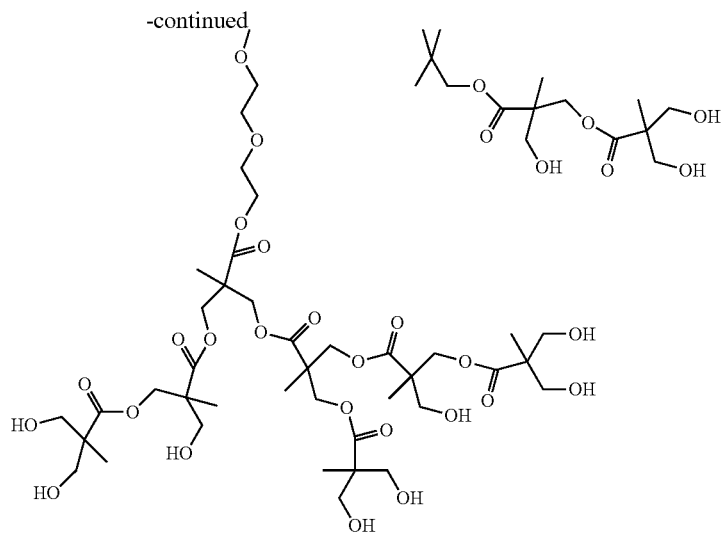

Hyperbranched polyester with 32 OH units

The hyperbranched polyesters were added to the standard gel formulation as an additive in two amounts to adjust the NH/OH ratios to an excess of 1.75 OH units to NH and an excess of 2.5 OH units to NH. We believe the water soluble polymer becomes entangled within the amine epoxy polymer matrix as the epoxy reaction takes place. To determine this we conducted FT-IR analysis of 5 different formulations, incorporating the hyperbranched dendrimer HP-16 and HP-32, which did not gel when mixed with JT-403 or with Poly EDGE. The FT-IR of all the neat samples were recorded on polyethylene films except the base gel which was recorded (as a reference) with KBr. Table 2 shows the major IR peaks of 5 different formulations including the polymerized gel without the HP-16 or HP-32.

TABLE 2

IR values of HP 16 and HP-32 formulations

| Formulation | IR values (in cm$^{-1}$) | | | | | | | |
|---|---|---|---|---|---|---|---|---|
| Polymerized gel | 3434, | | 2878 | | 1650, | 1361, | 1109, | 947 |
| JT-403 + HP-16 + H$_2$O | 3393, | 2920, | 2850, | | 1646, | 1380, | 1091 | |
| JT-403 + HP-32 + H$_2$O | 3386, | 2921, | 2853, | | 1646, | 1380, | 1091 | |
| Poly EDGE + HP-16 + H$_2$O | 3422, | 2920, | 2854, | 1730, | 1645, | 1354, 1247, | 1108 | |
| Poly EDGE + HP-32 + H$_2$O | 3418, | 2920, | 2855, | 1730, | 1647, | 1353, 1248, | 1106 | |

In the above table, IR values in the range of 3300 to 3500 cm$^{-1}$ indicates the O-H stretch of water and N—H stretch of primary amines. 2800-2900 cm$^{-1}$ indicates the C—H stretch of the aliphatic chain. 1640 cm$^{-1}$ is the C=O stretch of the hyper branched dendrimer. 1100-1200 cm$^{-1}$ is the region of C=O stretch of JT-403, XTJ-582 and Poly EDGE. 1109 cm$^{-1}$ is the C—N stretch of JT-403 and 947 is the N—H wagging frequency. For comparison, Table 2 shows the IR values of the individual components JT-403, Poly EDGE and hyper branched polyesters 16 and 32. The IR values of the above 5 samples show that there is no evidence of any amide bond formation involving the hyper branched polymer. However, we see a peak at 1730 cm$^{-1}$ which we believe correlates with the polyester chain in the Poly EDGE and HP combination formulations. The remaining peaks are in agreement with the structure of the dendrimer and other reactants.

III. Equilibrium Swelling

Cast cylinders were allowed to hydrate in deionizer water, aqueous sodium acetate 0.05 m amid acetic acid 0.05 m for 72 hours. Gel samples and 150 cc of a solution were used for all measurements. The hydrated samples were removed from the bath, blotted dry, and weight to obtained $W_t$. The $W_0$ and $W_t$, were average of 3 samples. Percent change mass of hydrogel samples H, was calculated according to Equation VI:

$$H=(W_t-W_0)/W_0 \quad \text{Equation VI}$$

where $W_0$ is the weight of the dried sample.

IV. Electrical Actuation

The gels were cast in 20 ml batch sizes and cast as one disc discs were then dry milled to achieve high surface area. Samples were weighed and allowed to reach equilibrium in electrolyte solution and then loaded into a test apparatus.

V. Force and Stroke Testing

Force and stroke testing was conducted using 1 gram of dry milled gel subjected to hydrating solutions in force sensing fixtures and stroke displacement fixtures, and the results recorded.

The amine epoxy gels elasticity is governed by the cross-linked density and the polymer backbone of the cross-linking di-epoxide. The speed and force of actuation strongly depends on the amine-epoxide group ratio [6, 7]. Typically we found that at NH ratios higher than 2.5, the gels are very sticky and easily break under further hydration. An improvement of the mechanical gel properties was achieved by different fillers like active carbons, clays [7] and other high surface additives. The polymer-polymer affinity is due to chemical interaction between the polymer and the solvent

[8]. Finally, the change of pH solution by the electrolysis impacts the hydrogen ion pressure. These three forces contribute to the osmotic pressure, which determines the equilibrium state of the gel and creates the volume change and total osmotic pressure [8-11] as long as it is determined by the reactive molecule species available on the polymer chains and within the polymer matrix.

The incorporation of the dendrimers into the hydrogels was investigated with zero, second and third generation of DAB and PAMAM dendrimers. Initial studies with incorporation of hyperbranched dendrimer SP-012 and elastomer XTJ-582 were also investigated. These gels were characterized in terms of swelling properties, mechanical properties and time dependent pH volume changes. Techniques like FTIR, DSC and TGA were used to characterize some of these hydrogels and additional hyperbranched polymers. We observed some significant trends in the properties of these actuators when the dendrimers and hyperbranched materials are incorporated into the gels and thus motivate us to carry further study on them.

The addition of OH groups gives the actuator gel an initial faster swelling response under electrical activation in the first 5 hrs over other versions of the amine epoxy gels. A similar trend of hydration swelling to activation swelling was shown in the dendrimer formulations of the gels.

We have shown the materials to produce >500% volume/weight gain in 1 hr under electrical activation. Previous to this work we were only able to get 100% volume/weight gain over 24 hours of activation and retain an intact gel actuator. We have successfully demonstrated that incorporation of dendrimers and hyperbranched materials result in pH responsive hydrogels that demonstrate (1) increased stability; (2) increased reproducibility of actuation; and we have demonstrated that the reactive molecule ratio can be manipulated to increased actuation response both in speed and pressure generation due to pronation or deprotonation of the molecules.

REFERENCES

[1] Plata, E R; Rogers, 1-1; Banister, M.; Vohnout, S.; McGrath, D. EAP Hydrogels for Pulse-Actuated Cell System (PACS) Architectures, Proceedings-SPIE The International Society for Optical Engineering, 2007, 6524, 65241T.1-6524 1T.8.
[2] Calvert, P.; Patra, P.; Duggal, D. Epoxy Hydrogels as Sensors and Actuators, Proceedings-SPIE The International Society for Optical Engineering, 2007, 6524, 65240M.1-65240M.6.
[3] Calvert, P. Elecetroactive Polymer Gel, in Eletroactive Polymer (EAP) Actuators as Artificial Muscles-Reality, Potential and Challenges, ed. Y.Bar-Chen, SPIE Press. Vol. PM98, 123-138, 2001.
[4] Yoshioka, Y.; Calvert, P. Epoxy-Based Electroactive Polymer Gels, Experimental Mechanics, 2002, 42, 404-408.
[5] Samui, A. B.; Jayakumar, S.; Jayalakshmi, C. G.; Pandey, K.; Sivaraman, P. Electroactive polymer gels based on epoxy resin, Smart Material and Structures, 2007, 16, 237-242.
[6] Richter, A.; Paschew, G.; Klatt, S.; Lienig, J.; Arndt, K-F.; Adler, H.-J. P. Review on. Hydrogel-based Sensors and Microsensors, Sensors, 2008, 8, 561-581.
[7] Omidian H.; Hashemi S.-A.; Askari, F.; Nafisi, S. Swelling and Crosslink Density Measurements for Hydrogels, Iranian Journal of Polymer Science and Technology, 1994, 3, 115-119.
[8] Choe, K.; Kim, K.; Doyeon, K.; Manford, C.; Heo, S.; Shahinpoor, M. Performance Characteristics of Electro-Chemically Driven Polyacrylonitrile Fiber Bundle Actuators, Journal of Intelligent Material Systems and Structures, 2006, 17, 563-576.
[9] Richter, A.; Paschew, G.; Klatt, S.; Lienig, J.; Arndt, K-F.; Adler, H.-J. P. Review on Hydrogel-based pH Sensors and Microsensors, Sensors, 2008, 8, 561-581.
[10] Schneider, H.-J.; Kato, K.; Strongin, R. Chemomechanical Polymers as Sensors and Actuators for Biological and Medicinal Applications, Sensors, 2007, 7, ~578-1611.
[11] Omidian H.; Hashemi S-A.; Askari, F.; Nafisi, S. Swelling and Crosslink Density Measurements for Hydrogels, Iranian Journal of Polymer Science and Technology, 1994, 3, 115-119.
[12] Bajpai, S. K.; Duhey, S. Synthesis and Swelling Kinetics of a pH-Sensitive Terpolymeric Hydrogel System, Iranian Polymer Journal, 2004, 13, 189-203.
[13] Sraydin, D.; Karadag, E.; Oztop, H. N.; Guven, O. Adsorption of Bovine Serum Albumin onto Acrylamide-Maleic Acid Hydrogels, Biomaterials, 1994, 15, 917-920.
[14] Skaarup, S. Polypyrrole for Artificial Muscles: Ionic Mechanisms, Solid State Jonics: Advanced Materials for Emerging Technologies, 2006, 10, 768-779.
[15] Velmurugu, Y; Skaarup, S. Ion and Solvent Transport in Polypyrrole: Experiment Test of Osmotic Model, Ionics, 2005, 11, 370-374.
[16] Gabrielli E C.; Keddam, M. Non-Steady State Techniques, Comprehensive Treatise of Electrochemistry, ed. E. Yeagar, J. O'M. Bockris, B. Conway, S. Sarangaparmi, Plenium Press, Vol. 9, 62-172 (1984).
[17] Tanaka, T.; Fillmore, D. Kinetics of swelling of gels, J. Chem. Phys., 1979, 70, 1214-1218
[18] Xiang, Y.; Peng, 1; Chen, D. A new polymer/clay nano-composite hydrogel with improved response rate and tensile mechanical properties, European Polymer Journal, 2006, 42, 2125-2132.

What we claim is:
1. A three-dimensional smart polymer matrix gel comprising linear polymer chain structures, branched polymer chain structures, reactive NH groups, reactive $NH_2$ groups, and reactive OH groups; wherein the three dimensional smart polymer matrix gel is formed by linking an epoxy reactant and an amine polymer reactant; wherein the epoxy reactant is at least one of polyethylene glycol diglycidyl ether and polypropylene glycol diglycidyl ether; wherein the amine polymer reactant comprises a branched polyether amine represented by the following chemical structure:

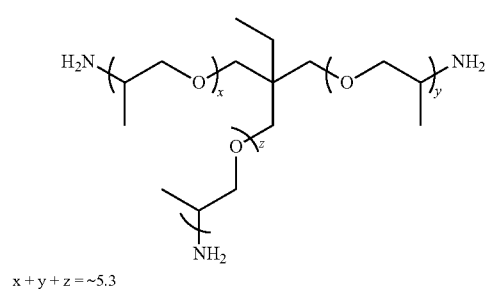

$x + y + z = \sim 5.3$ wherein the reactive NH groups, NH$_2$ groups, and OH groups are available for further chemical reaction, and the reactive NH groups and OH groups are present in a predetermined ratio;

wherein the three-dimensional smart polymer matrix gel has degree of gelation below 98%;

wherein the three dimensional smart polymer matrix gel is hydrophilic and non-soluble to a solvent or electrolyte; and wherein the linear polymer chain structures have random chain lengths within a range and determine the maximum swelling size of the polymer matrix gel.

2. The three-dimensional smart polymer matrix gel of claim 1 wherein the linear polymer chain structure and the branched polymer chain structures are flexible and elastic; wherein at least one of the reactive NH groups, NH$_2$ groups, and OH groups exhibit a polar attraction to a solvent or electrolyte; wherein the ratio of the reactive NH groups and OH groups determines a physical performance of the three-dimensional smart polymer matrix gel; and wherein at least one of the reactive NH groups, NH$_2$ groups, and OH groups are capable of participating in further chemical reactions, protonations or deprotonations.

3. The three-dimensional smart polymer matrix gel of claim 1 wherein at least one of the reactive NH groups, NH$_2$ groups, and OH groups are capable of participating in a reversible chemical reaction, protonation or deprotonation with a solvent or electrolyte dispersed within and around the three-dimensional smart polymer matrix gel; wherein the solvent or electrolyte contains one or more molecule species that can (a) bond with and reversibly change the molecular charge of the at least one of the reactive NH groups, NH$_2$ groups, and OH groups, or (b) reversibly bond with and reversibly change the molecular charge polarity of the at least one of the reactive NH groups, NH$_2$ groups, and OH groups.

4. The three-dimensional smart polymer matrix gel of claim 1, wherein the solvent or electrolyte contains one or more molecule species that can reversibly bond with and reversibly change the molecular charge, protonation or deprotonation strength of at least one of the reactive NH groups, NH$_2$ groups, and OH groups.

5. The three-dimensional smart polymer matrix gel of claim 1 wherein the linear polymer chain structures comprise a mixture of two or more linear polymer chain structures, and wherein the linear polymer chain structures are hydrophilic or a combination of hydrophilic and hydrophobic polymers.

6. The three-dimensional smart polymer matrix gel of claim 1, wherein the degree of gelation is below 90%.

7. The three-dimensional smart polymer matrix gel of claim 1, wherein the degree of gelation is between 75 and 85%.

8. The three-dimensional smart polymer matrix gel of claim 1, wherein the solvent or electrolyte contains one or more molecule species that can reversibly bond with and reversibly change the molecular charge, protonation or deprotonation of at least one of the reactive NH groups, NH$_2$ groups, and OH groups.

9. The three dimensional smart polymer matrix gel of claim 1, wherein the solvent or electrolyte contains one or more ion species.

10. The three dimensional smart polymer matrix gel of claim 1, wherein the solvent or electrolyte has more than one pKa value or dissociations.

11. The three dimensional smart polymer matrix gel of claim 1, wherein the chemistry of the solvent or electrolyte is sensitive to change as a result of an external energy stimuli.

12. The three-dimensional smart polymer matrix gel of claim 1 wherein the branched polymer chain structures have random chain lengths within a range.

13. The three-dimensional smart polymer matrix gel of claim 1, wherein the branched polymer chain structures additionally include hyperbranched polymers, dendrimer polymers or combination thereof, with one or more reactive end units, wherein the hyperbranched polymer, dendrimer polymer or combination thereof is crosslinked, with or as crosslink component of the three dimensional smart polymer matrix gel.

14. The three dimensional smart polymer matrix gel of claim 1, wherein one or more hyperbranched or dendrimer polymers with one or more reactive end units are entrapped or tangled and not crosslinked within the three dimensional smart polymer matrix gel.

\* \* \* \* \*